US008568953B2

(12) United States Patent
Kenjoh et al.

(10) Patent No.: US 8,568,953 B2

(45) Date of Patent: Oct. 29, 2013

(54) APPARATUS FOR PRODUCING TONER, METHOD FOR PRODUCING TONER, AND TONER

(75) Inventors: Kenta Kenjoh, Shizuoka (JP); Tetsuya Tanaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/388,537

(22) PCT Filed: Aug. 19, 2010

(86) PCT No.: PCT/JP2010/064429

§ 371 (c)(1), (2), (4) Date: Feb. 2, 2012

(87) PCT Pub. No.: WO2011/021722

PCT Pub. Date: Feb. 24, 2011

(65) Prior Publication Data

US 2012/0129091 A1 May 24, 2012

(30) Foreign Application Priority Data

Aug. 21, 2009 (JP) ................................ 2009-191544

(51) Int. Cl.

*B29B 9/00* (2006.01)

*G03G 9/087* (2006.01)

(52) U.S. Cl.

USPC .......................... 430/137.1; 430/123.5; 425/6

(58) Field of Classification Search

USPC ................................ 430/123.5, 137.1; 425/6

See application file for complete search history.

(56) References Cited

U.S. PATENT DOCUMENTS

| | | | |
|---|---|---|---|
| 7,553,599 B2 | 6/2009 | Ohtani | |
| 7,709,175 B2 | 5/2010 | Ohtani | |
| 8,029,961 B2 | 10/2011 | Kuramoto et al. | |
| 8,034,521 B2 | 10/2011 | Kuramoto et al. | |
| 8,034,526 B2 | 10/2011 | Watanabe et al. | |
| 2008/0063971 A1* | 3/2008 | Watanabe et al. | 430/110.4 |
| 2008/0122132 A1 | 5/2008 | Kinoshita et al. | |

(Continued)

FOREIGN PATENT DOCUMENTS

| | | |
|---|---|---|
| JP | 57 201248 | 12/1982 |
| JP | 2005 215090 | 8/2005 |

(Continued)

OTHER PUBLICATIONS

International Search Report Issued Oct. 19, 2010 in PCT/JP10/64429 Filed Aug. 19, 2010.

*Primary Examiner* — Thorl Chea

(74) *Attorney, Agent, or Firm* — Oblon, Spivak, McClelland, Maier & Neustadt, L.L.P.

(57) ABSTRACT

To provide an apparatus for producing a toner, including: a droplet forming unit configured to periodically discharge a toner composition liquid, which includes at least a resin and a colorant, from a plurality of nozzles so as to form droplets; a gas flow forming unit configured to form a gas flow which passes through a narrowed portion that corresponds to a nozzle formation area and that is placed on a downstream side of the nozzles with respect to a droplet discharge direction, and which advances in the droplet discharge direction; and a particle forming unit configured to form toner particles by solidifying the droplets of the toner composition liquid passed through the narrowed portion and then discharged, wherein the opening area of an opening which forms the narrowed portion decreases from an inlet side of the narrowed portion toward an outlet side of the narrowed portion.

17 Claims, 8 Drawing Sheets

(56) References Cited

U.S. PATENT DOCUMENTS

| | | | | |
|---|---|---|---|---|
| 2008/0227011 | A1 | 9/2008 | Kuramoto et al. | |
| 2008/0241727 | A1 | 10/2008 | Norikane et al. | |
| 2008/0248416 | A1 | 10/2008 | Norikane et al. | |
| 2008/0286679 | A1 | 11/2008 | Norikane et al. | |
| 2008/0286680 | A1* | 11/2008 | Norikane et al. | 430/110.4 |
| 2008/0292985 | A1 | 11/2008 | Suzuki et al. | |
| 2009/0117486 | A1 | 5/2009 | Watanabe et al. | |
| 2009/0170018 | A1 | 7/2009 | Kuramoto et al. | |
| 2009/0239170 | A1 | 9/2009 | Honda et al. | |
| 2009/0317738 | A1 | 12/2009 | Honda et al. | |
| 2009/0325100 | A1 | 12/2009 | Watanabe et al. | |
| 2010/0003613 | A1 | 1/2010 | Honda et al. | |
| 2010/0021209 | A1 | 1/2010 | Watanabe et al. | |

FOREIGN PATENT DOCUMENTS

| | | |
|---|---|---|
| JP | 3786034 | 3/2006 |
| JP | 3786035 | 3/2006 |
| JP | 2006 293320 | 10/2006 |
| JP | 2006 297325 | 11/2006 |
| JP | 2008 137377 | 6/2008 |
| JP | 2008 286947 | 11/2008 |
| JP | 2009 122647 | 6/2009 |
| JP | 2009 162819 | 7/2009 |

* cited by examiner

APPARATUS FOR PRODUCING TONER, METHOD FOR PRODUCING TONER, AND TONER

TECHNICAL FIELD

The present invention relates to an apparatus for producing a toner which is used as a developer for developing a latent electrostatic image in electrophotography, electrostatic recording, electrostatic printing, etc.; a method for producing a toner; and a toner obtained by the method.

BACKGROUND ART

Examples of methods for producing a toner by rendering a dispersion liquid or solution of a toner composition into droplets and drying and solidifying the droplets include a spray drying method with an atomizer (refer to PTL 1).

However, since particles obtained by a conventional spray drying method have relatively large particle diameters and a wide particle size distribution, it is difficult to form a toner with a sharp particle size distribution.

Regarding a method for producing a toner intended to take the place of the foregoing, there have been proposed a method and an apparatus in which fine droplets are formed utilizing a piezoelectric pulse, and the fine droplets are dried and solidified so as to form a toner (refer to PTL 2). Further, a method and an apparatus have been proposed in which fine droplets are formed utilizing thermal expansion that takes place inside a nozzle, and the fine droplets are dried and solidified so as to form a toner (refer to PTL 3).

However, the methods and the apparatuses described in PTLs 2 and 3 merely allow ejection of droplets from one nozzle using one piezoelectric material, and thus the number of droplets able to be ejected per unit time is small, thereby leading to poor productivity. Moreover, the employed structure in which a dry gas flow is supplied for each ejecting portion is inevitably complex and thus uneconomical.

Accordingly, as a toner producing method and apparatus capable of a plurality of ejections of droplets using one vibration source, there have been proposed a method and an apparatus in which a nozzle is vibrated by the expansion and contraction of a piezoelectric material serving as a vibration generating unit, droplets of a toner composition fluid are thereby ejected from the nozzle at a constant frequency, and the droplets are dried and solidified so as to form a toner (refer to PTL 4). Also, a method and an apparatus have been proposed in which there are provided an ejecting member having ejection holes, and a vibration generating unit configured to provide vibration to the ejecting member at a predetermined frequency, the ejecting member is vibrated so as to serve as a vibrating member, droplets are thereby ejected from the ejection holes, and the droplets are dried and solidified so as to form a toner (see PTL 5).

Since the toner producing methods and apparatuses described in PTLs 4 and 5 enable a plurality of ejections of droplets using one vibration source, it is possible to efficiently produce a toner with a relatively sharp particle size distribution. However, if the ejection direction of the droplets and the direction of a dry gas flow are not controlled, the gas flow will advance in an unintended direction, and thus unification (amalgamation) of initial droplets may be inevitable, especially in a frequency range over 100 kHz.

Accordingly, as a method for producing a toner capable of preventing unification (amalgamation) of droplets, there has been proposed a method wherein there is provided a gas flow forming unit configured to form a gas flow which passes through a narrowed portion (that corresponds to a nozzle formation area and that is placed on a downstream side with respect to a droplet discharge direction) and which advances in the droplet discharge direction, whereby the space between droplets is widened, the droplets are dried, solidified and rendered into a toner, preventing unification of the droplets, and a toner with a sharper particle size distribution is thus produced (refer to PTL 6).

However, the method for producing a toner described in PTL 6 does not suffice to prevent unification (amalgamation) of initial droplets and thus leaves room for consideration.

CITATION LIST

Patent Literature

[PTL 1] Japanese Patent Application Publication (JP-B) No. 57-201248

[PTL 2] Japanese Patent (JP-B) No. 3786034

[PTL 3] JP-B No. 3786035

[PTL 4] Japanese Patent Application Laid-Open (JP-A) No. 2006-293320

[PTL 5] JP-A No. 2006-297325

[PTL 6] JP-A No. 2008-286947

SUMMARY OF INVENTION

Technical Problem

The present invention makes it possible to obtain a toner with a sharp particle size distribution, and provide a method for producing a toner (hereinafter referred to also as "toner producing method") and an apparatus for producing a toner (hereinafter referred to also as "toner producing apparatus") that are capable of efficiently and stably producing the foregoing toner.

Solution to Problem

Means for solving the above-mentioned problems are as follows.

<1> An apparatus for producing a toner, including: a droplet forming unit configured to periodically discharge a toner composition liquid, which includes at least a resin and a colorant, from a plurality of nozzles so as to form droplets; a gas flow forming unit configured to form a gas flow which passes through a narrowed portion that corresponds to a nozzle formation area and that is placed on a downstream side of the nozzles with respect to a droplet discharge direction, and which advances in the droplet discharge direction; and a particle forming unit configured to form toner particles by solidifying the droplets of the toner composition liquid passed through the narrowed portion and then discharged, wherein the opening area of an opening which forms the narrowed portion decreases from an inlet side of the narrowed portion toward an outlet side of the narrowed portion.

<2> The apparatus according to <1>, wherein the opening area of the narrowed portion on the outlet side increases toward the downstream side with respect to the droplet discharge direction.

<3> The apparatus according to <1> or <2>, wherein the gas flow forming unit includes a gas supply unit and a gas flow path forming unit, wherein the gas flow path forming unit includes a gas flow path forming container and a gas flow controlling member placed inside the gas flow path forming container, and wherein the gas flow path forming container has a narrowed portion formed therein.

<4> The apparatus according to <3>, wherein the gas flow controlling member is provided at an outer circumferential portion of the droplet forming unit.

<5> A method for producing a toner, including: periodically discharging a toner composition liquid, which includes at least a resin and a colorant, from a plurality of nozzles so as to form droplets; forming a gas flow which passes through a narrowed portion that corresponds to a nozzle formation area and that is placed on a downstream side of the nozzles with respect to a droplet discharge direction, and which advances in the droplet discharge direction; and forming toner particles by solidifying the droplets of the toner composition liquid passed through the narrowed portion and then discharged, wherein the opening area of an opening which forms the narrowed portion decreases from an inlet side of the narrowed portion toward an outlet side of the narrowed portion.

<6> The method according to <5>, wherein the opening area of the narrowed portion on the outlet side increases toward the downstream side with respect to the droplet discharge direction.

<7> The method according to <5> or <6>, wherein a gas flow controlling member is provided at an outer circumferential portion of a droplet forming unit used in the periodically discharging.

<8> A toner obtained by the method according to any one of <5> to <7>.

Advantageous Effects of Invention

The present invention makes it possible to solve the above-mentioned problems, obtain a toner with a sharp particle size distribution, without causing unification (amalgamation) of initial droplets, and produce the toner efficiently and stably.

DESCRIPTION OF EMBODIMENTS

Figure 1:
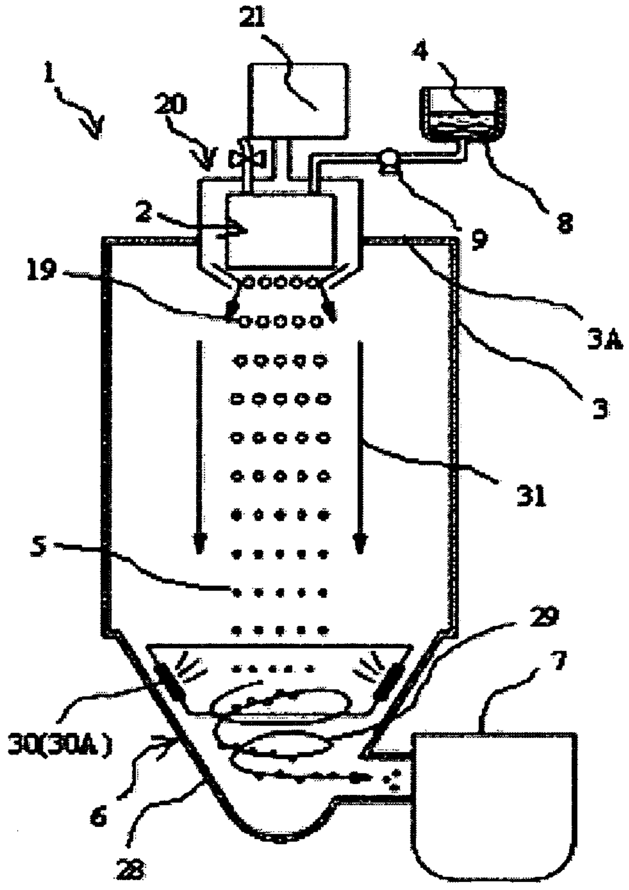
FIG. 1 is an explanatory cross-sectional view schematically showing an embodiment of a toner producing apparatus of the present invention.

Referring to the drawings attached, the following gives detailed explanations of an apparatus for producing a toner, a method for producing a toner, and an embodiment of a toner, which are all according to the present invention.

First of all, an explanation is given referring to the explanatory cross-sectional view in FIG. 1 that schematically shows an embodiment of a toner producing apparatus of the present invention.

A toner producing apparatus 1 includes a droplet jetting unit 2 as a droplet forming unit, and a particle forming portion 3 as a particle forming unit, with the droplet jetting unit 2 being placed at a top surface portion 3A of the particle forming portion 3. The particle forming portion 3 forms toner particles 5 by solidifying droplets of a toner composition liquid 4 discharged from the droplet jetting unit 2.

The toner producing apparatus 1 also includes a toner collecting portion 6 to collect the toner particles 5 formed by the particle forming portion 3, a toner storing portion 7 as a toner storing unit to store the toner particles 5 collected by the toner collecting portion 6, a toner composition liquid supplying portion 8 to supply the toner composition liquid 4, and a pump 9 to pump and supply the toner composition liquid 4 from inside this toner composition liquid supplying portion 8 to the droplet jetting unit 2.

The toner composition liquid 4 coming from the toner composition liquid supplying portion 8 is supplied in a self-feeding manner to the droplet jetting unit 2 by a droplet forming phenomenon effected by the droplet jetting unit 2; however, for example when the apparatus is in operation, the liquid is supplied thereto with the aid of the pump 9. Here, either a solution obtained by dissolving a toner composition, which includes at least a resin and a colorant, in a solvent, or a dispersion liquid obtained by dispersing this toner composition in a solvent is used as the toner composition liquid 4.

Although an example in which one droplet jetting unit 2 is provided is shown in FIG. 1, it is preferred that a plurality of droplet jetting units 2, for example 100 to 1,000 droplet jetting units 2 in view of controllability, be arranged at the top surface portion 3A of the particle forming portion 3. By doing so, it is possible to discharge plenty of droplets at one time and thus to improve productivity.

Figure 2:
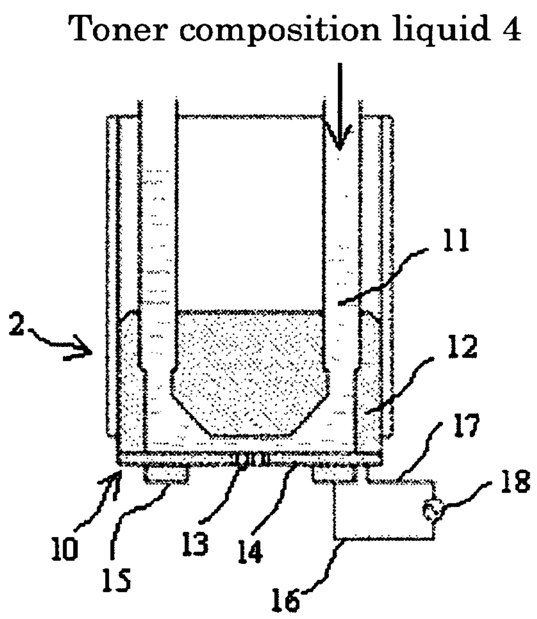
FIG. 2 is an explanatory enlarged cross-sectional view showing a droplet jetting unit.
Figure 3:
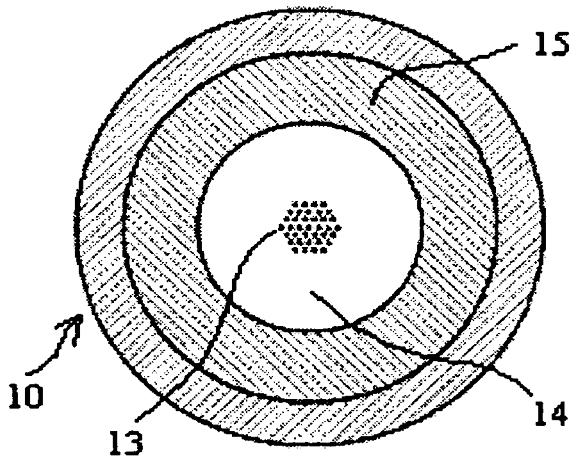
FIG. 3 is an explanatory bottom view showing main components of the droplet jetting unit of FIG. 2, as seen from below.
Figure 4:
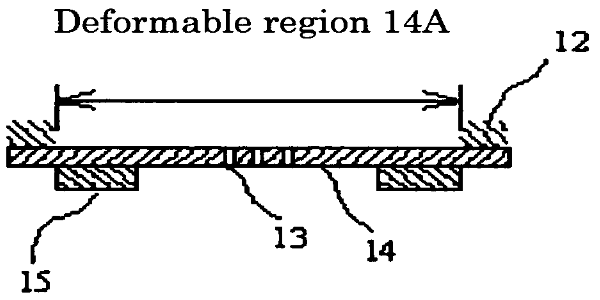
FIG. 4 is an explanatory enlarged cross-sectional view showing a droplet forming unit of the droplet jetting unit.

Next, an example of the droplet jetting unit 2 is explained referring to FIGS. 2 to 4. FIG. 2 is an explanatory enlarged cross-sectional view showing the droplet jetting unit 2, FIG. 3 is an explanatory bottom view showing main components of the droplet jetting unit of FIG. 2, as seen from below, and FIG. 4 is an explanatory enlarged cross-sectional view showing a droplet forming unit 10 of the droplet jetting unit 2.

This droplet jetting unit 2 includes a droplet forming unit 10 configured to render the toner composition liquid 4, which includes at least a resin and a colorant, into droplets and discharge the droplets, and a flow path member 12 provided with a reservoir (liquid flow path) 11 for supplying the toner composition liquid 4 to the droplet forming unit 10.

The droplet forming unit 10 includes a thin film 14 in which a plurality of nozzles (ejection ports) 13 are formed, and an annular (hereinafter referred to also as "ring-shaped") vibration generating unit 15 configured to vibrate the thin film 14. Here, regarding the thin film 14, the outermost circumferential portion (area shown by the diagonal lines in FIG. 3) is joined and fixed to the flow path member 12 by means of solder or a resinous binder material which does not dissolve in the toner composition liquid. The vibration generating unit 15 is annularly placed inside a deformable region 14A (region not fixed to the flow path member 12) of the thin film 14. By applying a drive voltage (drive signal) of a required frequency from a drive circuit (drive signal generating source) 18 to the vibration generating unit 15 via leads 16 and 17, the vibration generating unit 15 generates flexural vibration, for example. The vibration generating unit 15 is not particularly limited as long as it can surely give vibration to the thin film 14 at a constant frequency; nevertheless, preference is given to any piezoelectric material which excites bimorph flexural vibration. Examples of the piezoelectric material include piezoelectric ceramics such as lead zirconate titanate (PZT), which are often used in laminated form because they are generally small in displacement amount. Examples thereof also include piezoelectric polymers such as polyvinylidene fluoride (PVDF), and single crystals such as of rock crystal, $LiNbO_3$, $LiTaO_3$ and $KNbO_3$.

The material for the thin film 14 and the shape of the nozzles 13 are not particularly limited and may be suitably selected. For example, in view of the capability of generating fine droplets with a highly uniform particle diameter when droplets 19 of the toner composition liquid 4 are jetted from the nozzles 13, it is preferred that the thin film 14 be formed of a metal plate having a thickness of 5 μm to 500 μm and the nozzles 13 have an opening diameter of 3 μm to 35 μm each. The opening diameter of each nozzle 13 means the diameter thereof when the opening thereof is in the shape of a true circle, or means the minor axis thereof when the opening thereof is in the shape of an ellipse. Also, the number of the nozzles 13 is preferably in the range of 2 to 3,000.

Next, the mechanism of the droplet formation performed by the droplet jetting unit 2 as a droplet forming unit is explained referring to FIGS. 5 to 9.

Regarding the droplet jetting unit 2 in FIG. 2, by transmitting the vibration generated by the vibration generating unit 15 to the thin film 14 with the nozzles 13 that faces the reservoir 11, it is possible to vibrate the thin film 14 periodically, dispose the nozzles 13 in a relatively large area (1 mm or greater in diameter), and stably form and discharge the droplets 19 from the nozzles 13.

Figure 5A:
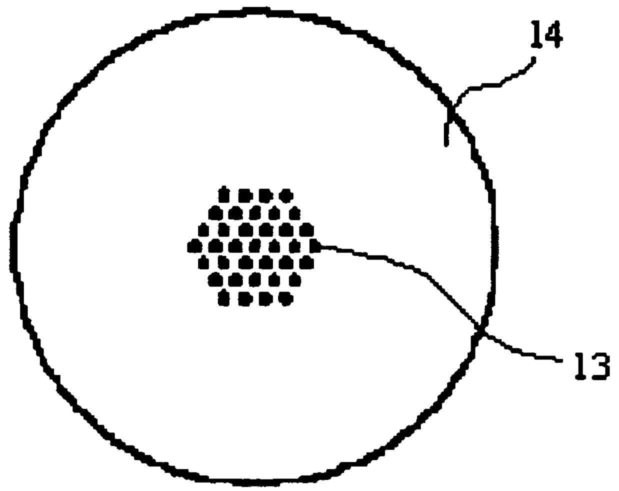
FIG. 5A is a schematic explanatory drawing of a thin film, used to explain an operational principle of formation of droplets performed by the droplet forming unit of the droplet jetting unit.
Figure 5B:
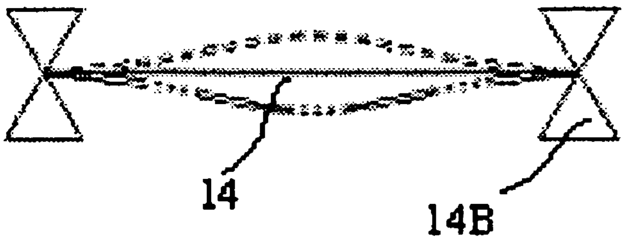
FIG. 5B is a schematic explanatory drawing of a thin film, used to explain an operational principle of formation of droplets performed by the droplet forming unit of the droplet jetting unit.
Figure 6:
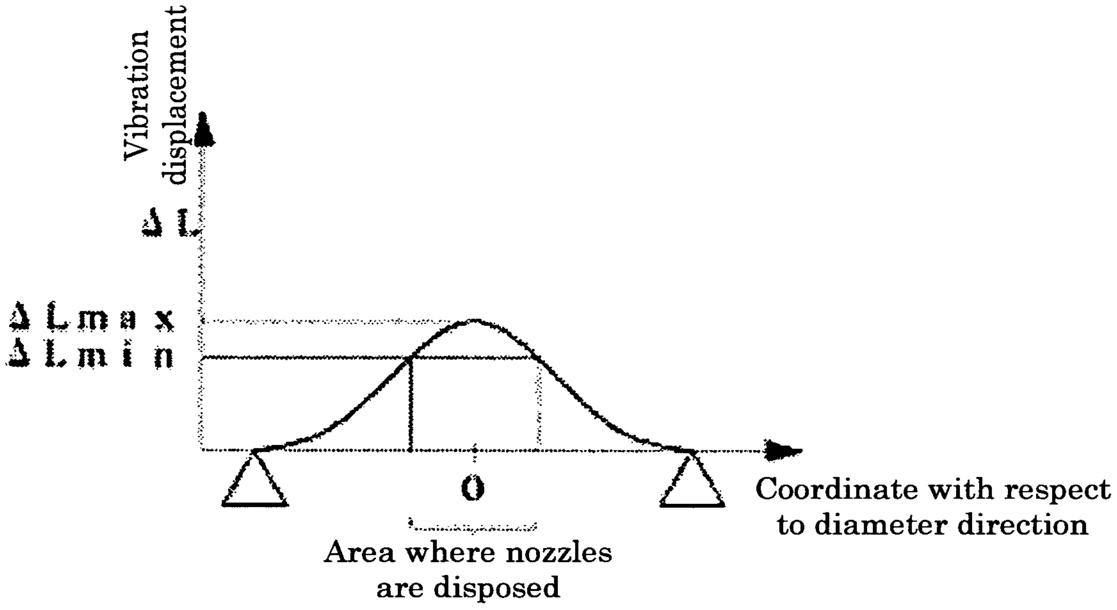
FIG. 6 is a schematic explanatory drawing of a thin film, used to explain a fundamental vibration mode performed by the droplet forming unit of the droplet jetting unit.

In the case where a peripheral portion 14B of a simple circular thin film 14 is fixed as shown in FIGS. 5A and 5B, the fundamental vibration of the simple circular thin film 14 is periodic up-and-down vibration in the vibration direction, which forms a cross-sectional shape as shown in FIG. 6 where the periphery of the simple circular thin film 14 is a node and the displacement ΔL becomes the maximum (ΔLmax) at the center O of the simple circular thin film 14.

Figure 7:
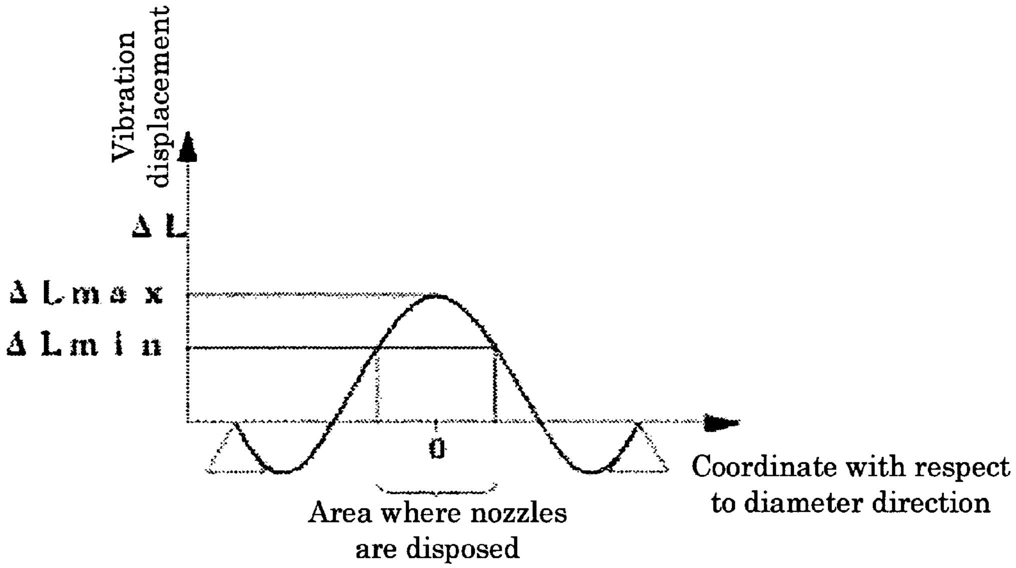
FIG. 7 is a schematic explanatory drawing of a thin film, used to explain a secondary vibration mode performed by the droplet forming unit of the droplet jetting unit.
Figure 8:
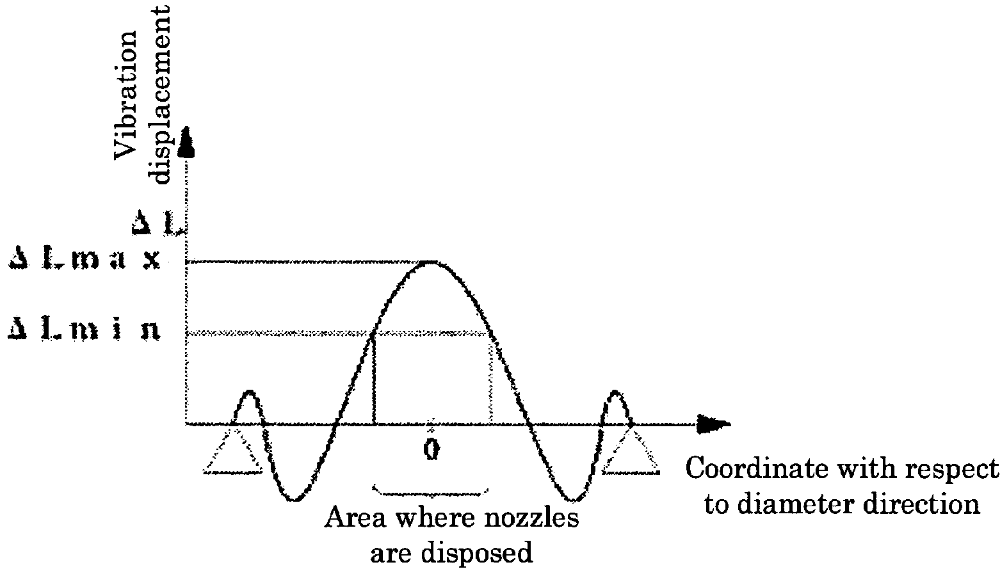
FIG. 8 is a schematic explanatory drawing of a thin film, used to explain a tertiary vibration mode performed by the droplet forming unit of the droplet jetting unit.
Figure 9:
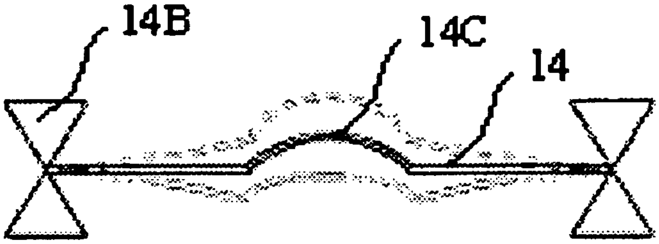
FIG. 9 is a schematic explanatory drawing of a thin film in relation to a case where a convex portion is formed at a central portion of the thin film of the droplet jetting unit.

Further, it is known that higher-order vibration modes as shown in FIGS. 7 and 8 exist. Regarding these modes, one or more nodes are concentrically provided within a simple circular thin film 14, thereby yielding a virtually axisymmetric deformed shape. Also, as shown in FIG. 9, by forming a convex shape 14C at a central portion of the simple circular thin film 14, it is possible to control the traveling direction of the droplets 19 and adjust the vibration amplitude.

By the vibration of the circular thin film 14, an acoustic pressure Pac that is proportional to the vibration velocity Vm of the thin film 14 is given to the toner composition liquid 4 situated in the vicinity of the nozzles 13 provided in the circular thin film 14. It is known that the acoustic pressure is generated as a counteraction to the radiation impedance Zr of the medium (toner composition liquid). The acoustic pressure is a product of the radiation impedance and the vibration velocity Vm and is represented by Equation (1) below.

$$Pac(r,t)=Zr\cdot Vm(r,t) \quad \text{Equation (1)}$$

Since the vibration velocity Vm of the thin film 14 periodically changes with time, it is a function of time. For example, various periodic variations such as a sine wave and a rectangular wave can be formed. Also, as described above, the vibration displacement with respect to the vibration direction varies from place to place on the thin film 14; the vibration velocity Vm is a function related to positional coordinates on the thin film 14. As for the vibration form of the thin film 14 employed in the present invention, the vibration takes place in an axisymmetric manner as described above. Therefore, the vibration velocity Vm is virtually a function related to radius coordinates.

As described above, an acoustic pressure proportional to the vibration displacement rate of the thin film 14 with a distribution is generated, and the toner composition liquid 4 is ejected to the gas phase in a manner connected with the periodic change of the acoustic pressure. Since the toner composition liquid 4 periodically ejected to the gas phase forms spheres due to the difference in surface tension between the liquid phase and the gas phase, droplet formation takes place periodically.

Here, the vibration frequency of the thin film 14 that enables formation of droplets is in the range of 20 kHz to 2.0 MHz, preferably 50 kHz to 500 kHz. When the vibration frequency is 20 kHz or greater, dispersion of fine particles of a pigment, a wax, etc. in the toner composition liquid 4 is promoted by the excitation of the liquid. Further, when the acoustic pressure is 10 kPa or greater, the dispersion of the fine particles is promoted in a more suitable manner.

In this case, the greater the vibration displacement in the vicinity of the nozzles 13 of the thin film 14 is, the larger the diameter of the formed droplets 19 tends to be. If the vibration displacement is small, small droplets are formed or droplets are not formed. To reduce variation in the size of droplets at the sites where the nozzles are, it is necessary to dispose the nozzles 13 in the positions where the vibration displacement of the thin film 14 is most suitable.

In the present invention, as shown in FIGS. 6 to 8, it has been found that by disposing the nozzles 13 at sites where the ratio R (=ΔLmax/ΔLmin) of the maximum value ΔLmax of the vibration displacement ΔL of the thin film 14 (with respect to the vibration direction) to the minimum value ΔLmin thereof is 2.0 or less in the vicinity of the nozzles 13, regarding the vibration generated by the vibration generating unit 15, it is possible to keep the variation in droplet size in a range required for toner fine particles capable of providing high-quality images.

Here, in the case where the vibration variation is greater than the vibration variation which makes it possible to obtain an intended droplet diameter (main droplets), small droplets (so-called "satellites") could be generated in addition to the main droplets. In the case where the vibration variation is small, droplets which are smaller than intended (also called "satellites") are generated as well. The term "satellites" means droplets having diameters which are clearly smaller than those of droplets intended to be obtained. An experiment conducted changing the conditions for the toner composition liquid revealed that there was similarity in the region where satellites started being generated within a region where the viscosity was 20 mPa·s or less and the surface tension was in the range of 20 mN/m to 75 mN/m. Therefore, the displacement amount of the acoustic pressure needs to be 500 kPa or less, more preferably 100 kPa or less.

Next, the particle forming portion 3, which forms the toner particles 5 by solidifying the droplets 19 of the toner composition liquid 4, is explained.

Here, as described above, since either a solution obtained by dissolving a toner composition, which includes at least a resin and a colorant, in a solvent, or a dispersion liquid obtained by dispersing this toner composition in a solvent is used as the toner composition liquid 4, the toner particles 5 are formed by drying and solidifying the droplets 19. In other words, in this embodiment, the particle forming portion 3 serves as a solvent removing portion (hereinafter, the particle forming portion 3 is referred to also as "solvent removing portion") which forms the toner particles 5 by drying and thus removing the solvent of the droplets 19.

Specifically, this particle forming portion 3 removes the solvent of the droplets 19 by conveying the droplets 19 (discharged from the nozzles 13 of the droplet jetting unit 2) utilizing a gas flow (which advances in the droplet discharge direction) formed by a gas flow forming unit 20, and thereby forms the toner particles 5. The gas used for the gas flow is a gas which is dry (a dry gas) 31. The dry gas 31 means a gas whose dew-point temperature is −10° C. or lower under atmospheric pressure. The dry gas 31 is not particularly limited as long as it can dry the droplets 19. Examples thereof include air and nitrogen.

Figure 10:
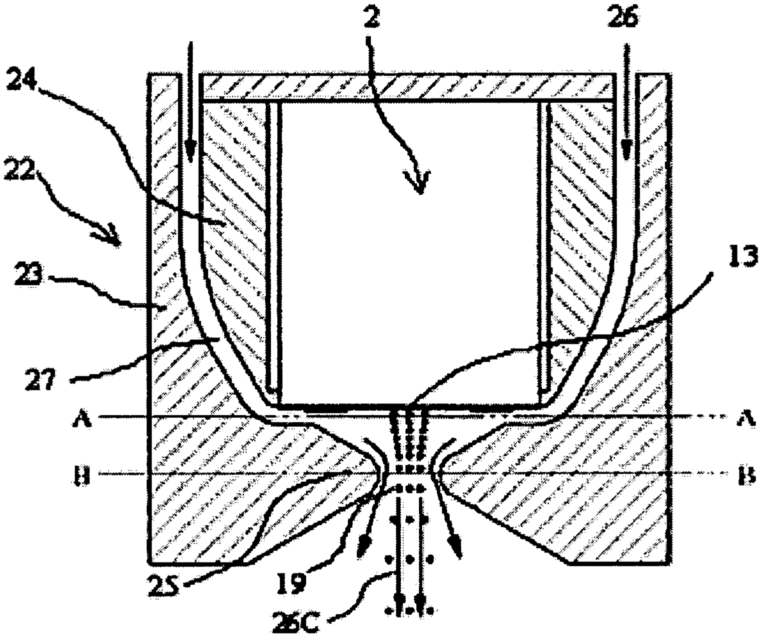
FIG. 10 is an explanatory front cross-sectional view used to explain a gas flow forming unit.
Figure 11:
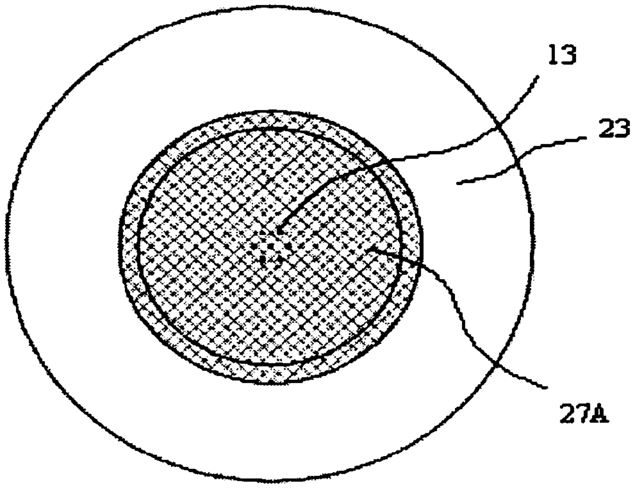
FIG. 11 is an explanatory drawing for explaining a cross section taken along the line A-A in FIG. 10.
Figure 12:
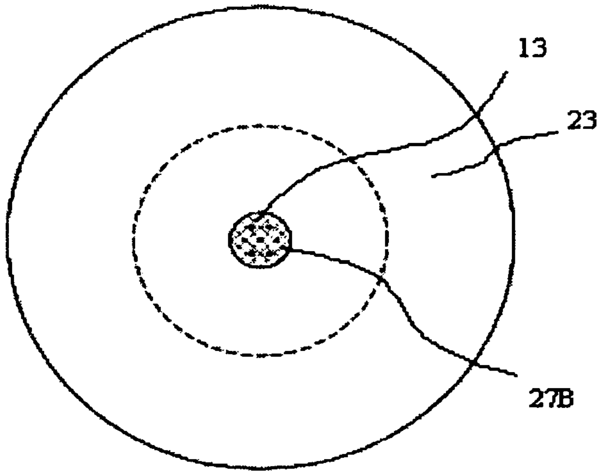
FIG. 12 is an explanatory drawing for explaining a cross section taken along the line B-B in FIG. 10.
Figure 13:
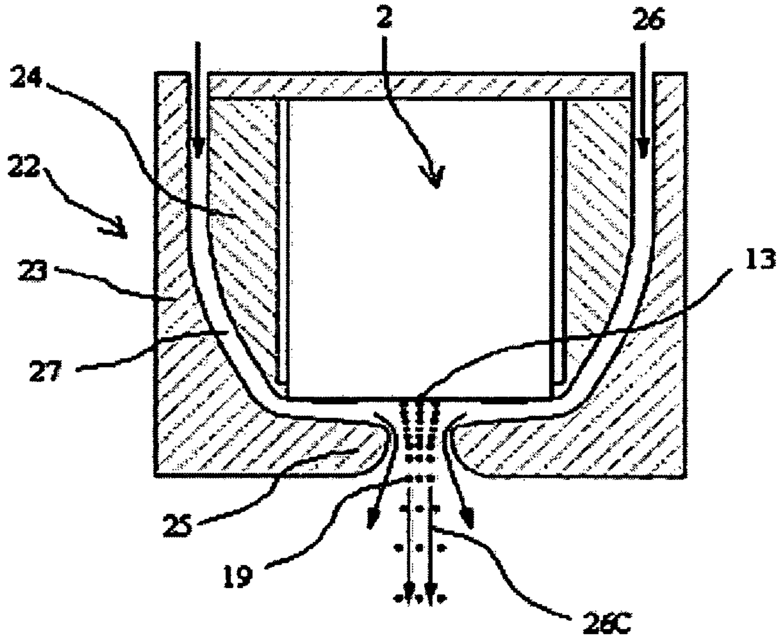
FIG. 13 is a schematic explanatory drawing used to explain another example of a gas flow forming unit.

Next, an example of the gas flow forming unit 20 is explained referring to FIGS. 10 to 14. FIG. 10 is an explanatory front cross-sectional view used to explain a gas flow forming unit, FIG. 11 is an explanatory drawing for explaining a cross section taken along the line A-A in FIG. 10, FIG. 12 is an explanatory drawing for explaining a cross section taken along the line B-B in FIG. 10, and FIG. 13 is a schematic explanatory drawing used to explain another example of the gas flow forming unit 20.

Figure 14:
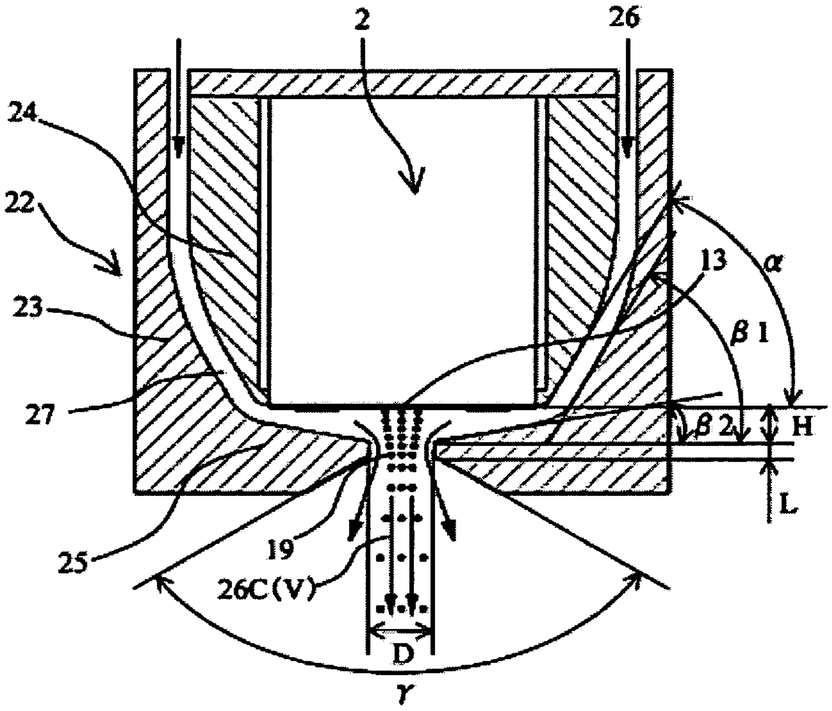
FIG. 14 is an explanatory cross-sectional view used to explain a gas flow forming unit in Example 1.

FIG. 14 shows a preferred example of the gas flow forming unit 20, which will be explained in detail in Example 1.

As shown in FIG. 10, a gas flow forming unit 20 includes a gas supply unit 21 (see FIG. 1) and a gas flow path forming unit 22. As the gas supply unit 21, a compressor or blower for general industrial use can be suitably used. It is preferred that one gas flow path forming unit 22 be provided for one droplet jetting unit.

The gas flow path forming unit 22 includes a gas flow path forming container 23 and a gas flow controlling member 24, with a narrowed portion 25 being provided at the center of a bottom portion of the gas flow path forming container 23. A gas pumped from the gas supply unit 21 forms a gas flow 26 which passes through the narrowed portion 25 provided on a downstream side of a thin film 14 of a droplet jetting unit 2 with respect to a droplet discharge direction, and through the gas flow controlling member 24 provided at an outer circumferential portion of the droplet jetting unit 2, and which advances in the droplet discharge direction.

In the gas flow path forming container 23, the narrowed portion 25 for narrowing a gas flow path 27 of the gas flow 26 is provided on the downstream side with respect to the droplet discharge direction (direction shown by the arrows 26C) in a manner that corresponds to a nozzle formation area of the thin film 14 of the droplet jetting unit 2. Thus, the velocity of the flow of the gas (gas flow 26) pumped from the gas supply unit 21 is increased at the narrowed portion 25. Here, the expression "narrowing a gas flow path" means that a gas flow path cross-sectional area 27B (shown as a cross-hatched area) in FIG. 12 (an explanatory drawing for explaining a cross section taken along the line B-B in FIG. 10) is smaller than a gas flow path cross-sectional area 27A (shown as a cross-hatched area) in FIG. 11 (an explanatory drawing for explaining a cross section taken along the line A-A in FIG. 10).

The form of the opening of the narrowed portion 25 may be selected from a variety of forms as long as the above-mentioned conditions are satisfied, and it is desirable to employ the form capable of most suitably preventing unification (amalgamation) of droplets and turbulence of the gas flow.

Also, when walls of the gas flow path forming container 23 and the gas flow controlling member 24, which form the gas flow path 27, have angular portion(s), the gas flow becomes turbulent. Therefore, the gas flow path 27 is preferably formed by continuously curved surfaces.

The opening area of the gas flow path forming container 23 decreases from an inlet side of the narrowed portion toward an outlet side of the narrowed portion, whereby turbulence of the gas pumped from the gas supply unit 21 is prevented, and the velocity distribution of the gas flow advancing in the droplet discharge direction is made uniform in the area through which the droplets 19 pass (hereinafter, this area is referred to as "passage area of the droplets 19"). Here, the term "turbulence of the gas" refers to occurrence of stagnation, a whirling flow, etc. The form of the gas flow path forming container 23 on the inlet side of the narrowed portion is not particularly limited as long as the above-mentioned conditions are satisfied. For example, the form may be an exponential form as shown in FIG. 13, apart from the tapered form as shown in FIG. 10.

By allowing the velocity distribution of the gas flow 26 advancing in the droplet discharge direction in the passage area of the droplets 19 on the inlet side of the narrowed portion of the gas flow path forming container 23 to be uniform, kinetic energy can be uniformly provided on a droplet-to-droplet basis. Therefore, a toner can be stably produced without causing a phenomenon in which droplets come into contact with one another and unify owing to the difference in velocity between the droplets ejected from a plurality of nozzles.

Further, the opening area of the gas flow path forming container 23 on the outlet side of the narrowed portion increases with respect to the direction of the gas flow. Widening the gas flow path 27 enables the gas flow 26 to advance in an outer circumferential direction, yields an increase in the distance between droplets, and thereby makes it possible to prevent contact between the droplets. The form of the gas flow path forming container 23 on the outlet side of the narrowed portion is not particularly limited as long as the above-mentioned conditions are satisfied. For example, the form may be an exponential form as shown in FIG. 13, apart from the tapered form as shown in FIG. 10.

Further, in the gas flow path forming unit 22, the gas flow controlling member 24, which makes it possible to freely alter the form of the gas flow path 27 of the gas flow 26 advancing in the droplet discharge direction, is provided at the outer circumferential portion of the droplet jetting unit 2 so as to adjust the gas introduction route and prevent turbulence of the gas, thereby reducing pressure loss of the gas flow 26 advancing in the droplet discharge direction. The form of the gas flow controlling member 24 is not particularly limited as long as the above-mentioned conditions are satisfied. For example, in view of gas flow control, it is preferred that its form correspond to the form of the gas flow path forming container 23 as shown in FIG. 10. If so, the gas flow can be efficiently converted to a gas flow advancing in the droplet discharge direction of the droplets 19, and uniformity of the velocity distribution of the gas flow 26 makes it possible to produce a toner efficiently and stably without causing a phenomenon in which droplets come into contact with one another and unify owing to the difference in velocity between the droplets ejected from a plurality of nozzles, as described above.

The opening area of the interior wall of the gas flow path forming container 23, which leads to the narrowed portion, preferably decreases toward the narrowed portion. Also, the exterior surface of the gas flow controlling member 24 is preferably formed in a manner that corresponds to the form of the gas flow path forming container 23. It is preferred that the interior wall of the gas flow path forming container 23, which leads to the narrowed portion, and the exterior surface of the gas flow controlling member 24 form a gas flow path shaped like a ring in cross section, and that the diameter of the ring decrease toward the narrowed portion.

The inlet pressure of the gas pumped from the gas supply unit 21 is easily adjustable. The velocity of the gas flow (narrowed portion gas flow) 26C at the narrowed portion 25 is preferably in the range of 2 m/s to 100 m/s, more preferably 5 m/s to 60 m/s. When the velocity of the gas flow 26C is less than 2 m/s, there may be a decrease in drying and solidifying capability, which possibly leads to a decrease in productivity. When the velocity of the gas flow 26C is greater than 100 m/s, division of the droplets 19 may arise, and thus the particle size distribution may degrade.

Next, the toner collecting portion 6 serving as a toner collecting unit configured to collect the toner particles 5 formed in the particle forming portion 3 is explained.

This toner collecting portion 6 is provided contiguously to the particle forming portion 3 on a downstream side of the particle forming portion 3 with respect to a particle flight direction and has a tapered surface 28 whose opening area gradually decreases from an inlet side (side of the droplet jetting unit 2) toward an outlet side. By performing suction from inside the toner collecting portion 6 using a suction pump (not shown) or the like, for example, a gas flow 29 that is a whirling flow advancing toward the downstream side is generated in the toner collecting portion 6, and the toner particles 5 are collected utilizing the gas flow 29. As just described, by generating centrifugal force utilizing the whirling flow (gas flow 29) so as to collect the toner particles 5, it is possible to collect the toner particles 5 surely and transfer them to the toner storing portion 7 situated on the downstream side.

Also, at an inlet portion of the toner collecting portion 6, there is provided a charge eliminating unit 30 configured to temporarily neutralize (eliminate) a charge of the toner particles 5 formed in the particle forming portion 3. Although a soft X-ray applying device 30A which applies soft X-rays to the toner particles 5 is employed as the charge eliminating unit 30, a plasma applying device which applies plasma to the toner particles 5 may be employed instead as the charge eliminating unit 30.

The toner particles 5 collected by the toner collecting portion 6 are directly transferred to the toner storing portion 7 by the whirling flow (gas flow 29) and stored therein. In this case, if the toner collecting portion 6 and the toner storing portion 7 are formed of conductive material, these portions are preferably grounded (earthed). Note that the producing apparatus as a whole is preferably proof against explosion. Additionally, the toner particles 5 may be pumped from the toner collecting portion 6 toward the toner storing portion 7, or the toner particles 5 may be suctioned from the side of the toner storing portion 7.

Next, an outline of a toner producing method using the toner producing apparatus 1 thus constructed is explained.

As described above, by applying a drive signal of a required drive frequency to the vibration generating unit 15 of the droplet forming unit 10 when the reservoir 11 of the droplet jetting unit 2 has been supplied with the toner composition liquid 4 in which a toner composition including at least a resin and a colorant is dispersed or dissolved, the vibration generating unit 15 generates flexural vibration, this flexural vibration of the vibration generating unit 15 causes the thin film 14 to vibrate periodically, this vibration of the thin film 14 causes the toner composition liquid 4 in the reservoir 11 to discharge from the nozzles 13 so as to form droplets periodically, and the droplets are discharged as the droplets 19 into the particle forming portion 3 as a solvent removing portion (see FIG. 1).

Then the droplets 19 discharged into the particle forming portion 3 are conveyed inside the particle forming portion 3 by the gas flow (formed by the gas flow forming unit 20) which advances in the same direction as the flight direction of the droplets 19. Thus, the solvent is removed, and the toner particles 5 are formed. The toner particles 5 formed in the particle forming portion 3 are collected by means of the gas flow 29 in the toner collecting portion 6 situated on the downstream side, sent to the toner storing portion 7 and stored therein.

As just described, since the droplet forming unit 10 of the droplet jetting unit 2 is provided with the plurality of nozzles 13, the plurality of droplets 19 of the toner composition liquid are simultaneously and continuously discharged in large numbers, and thus the production efficiency of the toner improves dramatically. In addition, as described above, the droplet forming unit 10 has a structure in which the vibration generating unit 15 is annularly placed inside the deformable region 14A of the thin film 14 with the nozzles 13 that faces the reservoir 11; thus, great displacement of the thin film 14 can be obtained, and the disposition of the nozzles 13 in an area where this great displacement can be obtained makes it possible to stably discharge the droplets 19 in large amounts at one time without causing clogging of the nozzles 13 and thus to produce a toner stably and efficiently. Further, it has been confirmed that a toner can be obtained which has a sharp particle size distribution like never before.

In this embodiment, as the toner composition liquid 4, either a solution obtained by dissolving a toner composition, which includes at least a resin and a colorant, in a solvent, or a dispersion liquid obtained by dispersing this toner composition in a solvent is used; regarding a means of solidifying the droplets 19, an organic solvent contained in the droplets 19 is vaporized into the dry gas 31 in the solvent removing portion (particle forming unit), and the toner particles 5 are formed by means of contraction and solidification based upon drying. It should, however, be noted that the present invention is not confined to this embodiment.

For example, the following embodiment is possible: the reservoir 11 is heated, a toner composition is melted and liquidized in the heated reservoir 11 so as to yield a toner composition liquid, this toner composition liquid is ejected and discharged as droplets, then these droplets are cooled and solidified so as to form toner particles. Also, the following embodiment is possible as well: a toner composition liquid containing a thermosetting substance is used, this toner composition liquid is discharged as droplets, then these droplets are heated, subjected to curing reaction and solidified so as to form toner particles.

Next, a toner according to the present invention is explained. A toner according to the present invention is obtained by the above-mentioned toner producing method using the toner producing apparatus. Thus, a toner having a sharp particle size distribution can be obtained.

Specifically, the particle size distribution of the toner, represented by "weight average particle diameter (D4)/number average particle diameter (Dn)", is preferably in the range of 1.00 to 1.05. Additionally, the weight average particle diameter of the toner is preferably in the range of 1 μm to 20 μm.

As described above, the toner obtained by the toner producing method according to the present invention can be easily redispersed, in other words floated, in the gas flow due to the effect of electrostatic repulsion. This makes it easily possible to convey the toner to a development area without using a conveyance unit such as is utilized in a conventional electrophotographic method. In other words, even a weak gas flow has sufficient conveying capability, so that it is possible to convey the toner to the development area by means of a simple air pump and directly use the toner for development. Since the development is so-called "powder cloud development" and image formation is not disturbed by the gas flow, excellent development of a latent electrostatic image can be performed. Also, the toner according to the present invention can be applied to a conventional developing method without problems. In this case, a carrier and members such as a development sleeve are simply used as toner conveying means, and thus a triboelectric charging mechanism, which is conventionally subject to functional division, does not have to be taken into consideration at all. Therefore, the degree of freedom of material increases greatly, so that it is possible to improve durability greatly and to use inexpensive materials and thus reduce costs.

[Toner Material]

Next, toner materials (a toner composition liquid) usable in the present invention are explained.

Toner materials include at least a resin and a colorant, and may, if necessary, include other components such as a carrier and a wax.

First of all, a toner composition liquid obtained by dispersing or dissolving a toner composition in a solvent, as described above, is explained.

The toner materials may be exactly the same as those for a conventional electrophotographic toner. Specifically, intended toner particles can be produced by dissolving a toner binder such as a styrene-acrylic resin, polyester resin, polyol resin or epoxy resin in an organic solvent, dispersing a colorant in the solution, dispersing or dissolving a release agent in the mixture, then rendering the obtained product into fine droplets and drying and solidifying the fine droplets in accordance with the toner producing method.

An intended toner can also be produced by rendering a liquid (prepared by dissolving or dispersing in a solvent a kneaded product obtained by thermally melting and kneading the above-mentioned materials) into fine droplets and drying and solidifying the fine droplets in accordance with the toner producing method.

[Resin]

Examples of the resin include at least binder resins.

The binder resins are not particularly limited, and a commonly used binder resin may be suitably selected for the resin. Examples of the binder resins include vinyl polymers based upon styrene monomers, acrylic monomers, methacrylic monomers, etc., copolymers composed of monomers of one type or monomers of two or more types among these monomers, polyester polymers, polyol resins, phenol resins, silicone resins, polyurethane resins, polyamide resins, furan resins, epoxy resins, xylene resins, terpene resins, coumarone-indene resins, polycarbonate resins and petroleum resins.

Examples of the styrene monomers include styrenes such as styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene and p-nitrostyrene; and derivatives thereof.

Examples of the acrylic monomers include acrylic acids such as acrylic acid, methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate and phenyl acrylate; and esters thereof.

Examples of the methacrylic monomers include methacrylic acids such as methacrylic acid, methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate and diethylaminoethyl methacrylate; and esters thereof.

Examples of other monomers constituting the vinyl polymers or copolymers include (1) to (18) below. (1) monoolefins such as ethylene, propylene, butylene and isobutylene; (2) polyenes such as butadiene and isoprene; (3) vinyl halides such as vinyl chloride, vinylidene chloride, vinyl bromide and vinyl fluoride; (4) vinyl esters such as vinyl acetate, vinyl propionate and vinyl benzoate; (5) vinyl ethers such as vinyl methyl ether, vinyl ethyl ether and vinyl isobutyl ether; (6) vinyl ketones such as vinyl methyl ketone, vinyl hexyl ketone and methyl isopropenyl ketone; (7) N-vinyl compounds such as N-vinylpyrrole, N-vinylcarbazole, N-vinylindole and N-vinylpyrrolidone; (8) vinylnaphthalenes; (9) acrylic or methacrylic acid derivatives such as acrylonitrile, methacrylonitrile and acrylamide; (10) unsaturated dibasic acids such as maleic acid, citraconic acid, itaconic acid, alkenylsuccinic acid, fumaric acid and mesaconic acid; (11) unsaturated dibasic acid anhydrides such as maleic acid anhydride, citraconic acid anhydride, itaconic acid anhydride and alkenylsuccinic acid anhydride; (12) monoesters of unsaturated dibasic acids, such as maleic acid monomethyl ester, maleic acid monoethyl ester, maleic acid monobutyl ester, citraconic acid monomethyl ester, citraconic acid monoethyl ester, citraconic acid monobutyl ester, itaconic acid monomethyl ester, alkenylsuccinic acid monomethyl ester, fumaric acid monomethyl ester and mesaconic acid monomethyl ester; (13) unsaturated dibasic acid esters such as dimethylmaleic acid and dimethylfumaric acid; (14) α,β-unsaturated acids such as crotonic acid and cinnamic acid; (15) α,β-unsaturated acid anhydrides such as crotonic acid anhydride and cinnamic acid anhydride; (16) carboxyl group-containing monomers such as anhydrides of the α,β-unsaturated acids and lower fatty acids, alkenylmalonic acid, alkenylglutaric acid, alkenyladipic acid, acid anhydrides of these acids and monoesters of these acids; (17) acrylic or methacrylic hydroxyalkyl esters such as 2-hydroxyethyl acrylate, 2-hydroxyethyl methacrylate and 2-hydroxypropyl methacrylate; (18) hydroxyl group-containing monomers such as 4-(1-hydroxy-1-methylbutyl)styrene and 4-(1-hydroxy-1-methylhexyl)styrene In the toner according to the present invention, a vinyl polymer or copolymer used as a binder resin may have a structure cross-linked with a cross-linking agent containing two or more vinyl groups. Examples of the cross-linking agent used in this case, as aromatic divinyl compounds, include divinylbenzene and divinylnaphthalene. Examples thereof as diacrylate compounds in which acrylates are bonded together with an alkyl chain include ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and compounds obtained by changing the acrylates of the above-mentioned compounds to methacrylates. Examples thereof as diacrylate compounds in which acrylates are bonded together with an alkyl chain containing an ether bond include diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by changing the acrylates of the above-mentioned compounds to methacrylates.

Examples of the cross-linking agent also include diacrylate or dimethacrylate compounds in which acrylates or methacrylates are bonded together with a chain containing an aromatic group and an ether bond. Examples of polyester diacrylates include MANDA (product name) (manufactured by Nippon Kayaku Co., Ltd.).

Examples of polyfunctional cross-linking agents include pentaerythritol triacrylate, trimethylolethane triacrylate, trimethylolpropane triacrylate, tetramethylolmethane tetraacrylate, oligoester acrylate, compounds obtained by changing the acrylates of the above-mentioned compounds to methacrylates, triallyl cyanurate and triallyl trimellitate.

It is preferred to use any of these cross-linking agents in an amount of 0.01 parts by mass to 10 parts by mass, more preferably 0.03 parts by mass to 5 parts by mass, with respect to 100 parts by mass of the other monomer components. Among these cross-linkable monomers, in terms of fixing properties and offset resistance, aromatic divinyl compounds (especially divinylbenzene) and diacrylate compounds in which acrylates are bonded together with a bonding chain containing one aromatic group and one ether bond are particularly suitable as resins usable for the toner. Among these, combinations of monomers which constitute styrene copolymers or styrene-acrylic copolymers are preferable.

Examples of polymerization initiators usable for producing the vinyl polymer or copolymer in the present invention include 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2',4'-dimethyl-4'-methoxyvaleronitrile, 2,2'-azobis(2-methylpropane), ketone peroxides (such as methyl ethyl ketone peroxide, acetylacetone peroxide and cyclohexanone peroxide), 2,2-bis(tert-butylperoxy) butane, tert-butyl hydroperoxide, cumene hydroperoxide, 1,1,3,3-tetramethylbutyl hydroperoxide, di-tert-butyl peroxide, tert-butylcumyl peroxide, di-cumyl peroxide, α-(tert-butylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropylperoxy dicarbonate, di-2-ethylhexylperoxy dicarbonate, di-n-propylperoxy dicarbonate, di-2-ethoxyethylperoxy carbonate, di-ethoxyisopropylperoxy dicarbonate, di(3-methyl-3-methoxybutyl)peroxy carbonate, acetylcyclohexylsulfonyl peroxide, tert-butylperoxy acetate, tert-butylperoxy isobutylate, tert-butylperoxy-2-ethylhexanoate, tert-butylperoxy laurate, tert-butyl-oxybenzoate, tert-butylperoxy isopropyl carbonate, di-tert-butylperoxy isophthalate, tert-butylperoxy allyl carbonate, isoamylperoxy-2-ethylhexanoate, di-tert-butylperoxy hexahydroterephthalate and tert-butylperoxy azelate.

In the case where the binder resin is a styrene-acrylic resin, it is preferred in terms of fixation properties, offset resistance and storage stability that the molecular weight distribution of the resin content soluble in tetrahydrofuran (THF), measured by GPC, have at least one peak in the molecular weight range of 3,000 to 50,000 (number average molecular weight equivalent) and at least one peak in the 100,000 and above molecular weight range. Regarding the resin content soluble in THF, preference is given to a binder resin, 50% to 90% of whose components are in the 100,000 and below molecular weight range, more preferably a binder resin having a main peak in the molecular weight range of 5,000 to 30,000, most preferably a binder resin having a main peak in the molecular weight range of 5,000 to 20,000.

In the case where the binder resin is a vinyl polymer such as a styrene-acrylic resin, the acid value of the binder resin is preferably in the range of 0.1 mgKOH/g to 100 mgKOH/g, more preferably 0.1 mgKOH/g to 70 mgKOH/g, most preferably 0.1 mgKOH/g to 50 mgKOH/g.

Examples of monomers constituting the polyester polymers are as follows.

Examples thereof as dihydric alcohol components include ethylene glycol, propylene glycol, 1,3-bitanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and diols obtained by polymerizing bisphenol A with cyclic ethers such as ethylene oxide and propylene oxide. To cross-link a polyester resin, it is preferred that a trihydric or higher alcohol be also used.

Examples of the trihydric or higher alcohol include sorbitol, 1,2,3,6-hexanetetrol, 1,4-sorbitan, pentaerythritols (such as dipentaerythritol and tripentaerythritol), 1,2,4-butanetriol, 1,2,5-pentatriol, glycerol, 2-methylpropanetriol, 2-methyl-1,2,4-butanetriol, trimethylolethane, trimethylolpropane and 1,3,5-trihydroxybenzene.

Examples of acid components contained in the polyester polymers include benzene dicarboxylic acids such as phthalic acid, isophthalic acid and terephthalic acid, and anhydrides thereof; alkyl dicarboxylic acids such as succinic acid, adipic acid, sebacic acid and azelaic acid, and anhydrides thereof; unsaturated dibasic acids such as maleic acid, citraconic acid, itaconic acid, alkenylsuccinic acid, fumaric acid and mesaconic acid; and unsaturated dibasic acid anhydrides such as maleic acid anhydride, citraconic acid anhydride, itaconic acid anhydride and alkenylsuccinic acid anhydride. Examples thereof as trivalent or higher carboxylic acid components include trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, tetra(methylenecarboxy) methane, 1,2,7,8-octanetetracarboxylic acid, Enpol trimer acid, anhydrides thereof and partial lower alkyl esters thereof.

In the case where the binder resin is a polyester resin, it is preferred in terms of the fixation properties and offset resistance of the toner that the molecular weight distribution of the resin content soluble in THF have at least one peak in the molecular weight range of 3,000 to 50,000. Regarding the resin content soluble in THF, preference is given to a binder resin, 60% to 100% of whose components are in the 100,000 and below molecular weight range, more preferably a binder resin having at least one peak in the molecular weight range of 5,000 to 20,000.

In the case where the binder resin is a polyester resin, the acid value of the binder resin is preferably in the range of 0.1 mgKOH/g to 100 mgKOH/g, more preferably 0.1 mgKOH/g to 70 mgKOH/g, most preferably 0.1 mgKOH/g to 50 mgKOH/g.

In the present invention, the molecular weight distribution of the binder resin is measured by gel permeation chromatography (GPC) with THF used as a solvent.

Examples of binder resins usable for the toner according to the present invention further include resins which have the vinyl polymer components and/or the polyester resin components and which also have (in the vinyl polymer components and/or the polyester resin components) monomer components capable of reacting with the vinyl polymer components and/or the polyester resin components. Examples of monomers capable of reacting with the vinyl polymer components, among monomers constituting the polyester resin components, include unsaturated dicarboxylic acids such as phthalic acid, maleic acid, citraconic acid and itaconic acid, and anhydrides thereof. Examples of monomers constituting the vinyl polymer components include carboxyl group-containing monomers, hydroxyl group-containing monomers, and acrylic acid or methacrylic acid esters.

In the case where a polyester polymer, a vinyl polymer and other binder resin(s) are used in combination, it is preferred that resins having an acid value of 0.1 mgKOH/g to 50 mgKOH/g as a whole be contained in an amount of 60% by mass or more.

In the present invention, the acid value of a binder resin content in the toner composition is calculated as follows. Fundamental operation is in accordance with JIS K-0070.

(1) Regarding a sample, additives other than a binder resin (polymer component) are removed beforehand, or the acid values and amounts of components other than a binder resin and a cross-linked binder resin are measured beforehand. A pulverized product of the sample is accurately weighed and adjusted to the range of 0.5 g to 2.0 g. The weight of the polymer component is denoted by Wg. For example, in the case where the acid value of the binder resin is measured based upon the toner, the acid values and amounts of a colorant, a magnetic material, etc. are separately measured, and then the acid value of the binder resin is determined by calculation.

(2) The sample is placed in a 300 (mL) beaker, then 150 (mL) of a mixed solution of toluene/ethanol (volume ratio: 4/1) is added to dissolve the sample.

(3) Titration is carried out using a 0.1 mol/L KOH ethanol solution and a potentiometric titrator.

(4) The amount of the KOH solution used at this time is denoted by S (mL). Also, the blank value is measured, and the amount of the KOH solution used at this time is denoted by B (mL). The acid value is calculated by means of the following equation. In the equation, the letter "f" denotes the factor of KOH.

$$\text{Acid value(mgKOH/g)}=[(S-B)\times f\times 5.61]/W$$

In terms of the storage stability of the toner, the toner's binder resin and composition containing the binder resin preferably have a glass transition temperature (Tg) of 35° C. to 80° C., more preferably 40° C. to 75° C. When the Tg is lower than 35° C., the toner easily degrade in a high-temperature atmosphere, and offset easily arises at the time of fixation. When the Tg is higher than 80° C., fixation properties may degrade.

Examples of magnetic materials usable in the present invention include (1) magnetic iron oxides such as magnetite, maghemite and ferrite, and iron oxides containing other metal oxides; (2) metals such as iron, cobalt and nickel, and alloys of these metals and metals such as aluminum, cobalt, copper, lead, magnesium, tin, zinc, antimony, beryllium, bismuth, cadmium, calcium, manganese, selenium, titanium, tungsten and vanadium; and (3) mixtures of these materials.

Specific examples of the magnetic materials include $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder and nickel powder. These may be used individually or in combination. Among these, fine powders of $Fe_3O_4$ and $\gamma$-$Fe_2O_3$ are particularly suitable.

Also, magnetic iron oxides (such as magnetite, maghemite and ferrite) each containing a different kind of element, and mixtures of such magnetic iron oxides may be used as well. Examples of the different kind of element include lithium, beryllium, boron, magnesium, aluminum, silicon, phosphorus, germanium, zirconium, tin, sulfur, calcium, scandium, titanium, vanadium, chromium, manganese, cobalt, nickel, copper, zinc and gallium. A preferred different kind of element is selected from magnesium, aluminum, silicon, phosphorus and zirconium. The different kind of element may be contained in an iron oxide crystal lattice, may be contained as an oxide in iron oxide, or may be present as an oxide or hydroxide on the surface. Nevertheless, it is preferably contained as an oxide.

Regarding the above-mentioned different kinds of elements, their respective salts may be present in a mixed manner when the magnetic materials are produced, then they may be contained in particles by pH adjustment. Also, by carrying out pH adjustment after particles of the magnetic materials are formed, or adding respective salts of the different kinds of elements and then carrying out pH adjustment, the elements may be deposited on particle surfaces. The amount of any of these magnetic materials is preferably in the range of 10 parts by mass to 200 parts by mass, more preferably 20 parts by mass to 150 parts by mass, with respect to 100 parts by mass of the binder resin. The number average particle diameter of any of these magnetic materials is preferably in the range of 0.1 μm to 2 μm, more preferably 0.1 μm to 0.5 μm. The number average particle diameter thereof can be worked out by analyzing (with a digitizer or the like) a photograph of the magnetic material taken in an enlarged manner using a transmission electron microscope.

Magnetic properties of the magnetic material are preferably as follows: when a magnetic field of 10K oersted is applied, the coercivity is in the range of 20 oersted to 150 oersted, the saturated magnetization is in the range of 50 emu/g to 200 emu/g, and the remnant magnetization is in the range of 2 emu/g to 20 emu/g.

The magnetic material may be used as a colorant as well.

[Colorant]

The colorant is not particularly limited, and a commonly used resin may be suitably selected therefor. Examples of the colorant include carbon blacks, nigrosine dyes, iron black, Naphthol Yellow S, Hansa Yellow (10G, 5G, G), cadmium yellow, yellow iron oxide, yellow ocher, yellow lead, titanium yellow, polyazo yellow, oil yellow, Hansa Yellow (GR, A, RN, R), Pigment Yellow L, Benzidine Yellow (G, GR), Permanent Yellow (NCG), Vulcan Fast Yellow (5G, R), Tartrazine Lake, Quinoline Yellow Lake, Anthrazane Yellow BGL, isoindolinone yellow, red ocher, red lead, lead vermilion, cadmium red, cadmium mercury red, antimony vermilion, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL, F4RH), Fast Scarlet VD, Vulcan Fast Rubine B, Brilliant Scarlet G, Lithol Rubine GX, Permanent Red FSR, Brilliant Carmine 6B, Pigment Scarlet 3B, Bordeaux 5B, Toluidine Maroon, Permanent Bordeaux F2K, Helio Bordeaux BL, Bordeaux 10B, Bon Maroon Light, Bon Maroon Medium, Eosin Lake, Rhodamine Lake B, Rhodamine Lake Y, Alizarine Lake, Thioindigo Red B, Thioindigo Maroon, oil red, quinacridone red, pyrazolone red, polyazo red, chrome vermilion, benzidine orange, perynone orange, oil orange, cobalt blue, cerulean blue, Alkali Blue Lake, Peacock Blue Lake, Victoria Blue Lake, metal-free phthalocyanine blue, phthalocyanine blue, Fast Sky Blue, Indanthrene Blue (RS, BC), indigo, ultramarine, Prussian blue, anthraquinone blue, Fast Violet B, Methyl Violet Lake, cobalt violet, manganese violet, dioxane violet, anthraquinone violet, chrome green, zinc green, chromium oxide, viridian, emerald green, Pigment Green B, Naphthol Green B, Green Gold, Acid Green Lake, Malachite Green Lake, phthalocyanine green, anthraquinone green, titanium oxide, zinc oxide, lithopone, and mixtures thereof.

The colorant preferably occupies 1% by mass to 15% by mass, more preferably 3% by mass to 10% by mass, of the toner.

The colorant used in the toner according to the present invention may be compounded with a resin to form a masterbatch. Examples of binder resins used for producing masterbatches or kneaded with masterbatches include (besides the above-mentioned modified or unmodified polyester resins) polymers of styrenes such as polystyrene, poly-p-chlorostyrene and polyvinyltoluene, and of substitution products of the styrenes; styrene copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-α-methyl chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer and styrene-maleic acid ester copolymer; polymethyl methacrylate, polybutyl methacrylate, polyvinyl chloride, polyvinyl acetate, polyethylene, polypropylene, polyesters, epoxy resins, epoxy polyol resins, polyurethanes, polyamides, polyvinyl butyral, polyacrylic acid resins, rosins, modified rosins, terpene resins, aliphatic or alicyclic hydrocarbon resins, aromatic petroleum resins, chlorinated paraffins and paraffin waxes. These may be used individually or in combination.

The masterbatch can be obtained by mixing and kneading the colorant and the resin for use in a masterbatch, with the application of high shearing force. In doing so, an organic solvent may be used to enhance interaction between the colorant and the resin. Also, the so-called flushing method, in which an aqueous paste containing a colorant and water is mixed and kneaded with a resin and an organic solvent and then the colorant is transferred to the resin to remove water and components of the organic solvent, can be suitably used because wet cake of the colorant can be used as it is, and so drying is not required. For this mixing and kneading, a high shearing dispersing apparatus such as a triple roll mill is favorably used.

The amount of the masterbatch used is preferably in the range of 0.1 parts by mass to 20 parts by mass with respect to 100 parts by mass of the binder resin.

It is preferred that the resin for use in a masterbatch have an acid value of 30 mgKOH/g or less and an amine value of 1 to 100, with the colorant being used in a dispersed manner, and more preferred that the resin have an acid value of 20 mgKOH/g or less and an amine value of 10 to 50, with the colorant being used in a dispersed manner. When it has an acid value of more than 30 mgKOH/g, there may be a decrease in chargeability at high humidity, and a deficiency in pigment dispersibility. Also, when it has an amine value of less than 1 or greater than 100, there may a deficiency in pigment dispersibility as well. The acid value can be measured in accordance with JIS K0070, and the amine value can be measured in accordance with JIS K7237.

Also, a dispersant may be used. In view of pigment dispersibility, it is preferred that the dispersant be highly compatible with the binder resin. Specific examples thereof as commercially available products include AJISPER PB821 and AJISPER PB822 (manufactured by Ajinomoto Fine-Techno Co., Inc.), Disperbyk-2001 (manufactured by BYK-Chemie GmbH) and EFKA-4010 (manufactured by EFKA Additives B.V.).

The amount of the dispersant mixed into the toner is preferably in the range of 0.1% by mass to 10% by mass with respect to the colorant. When the amount is less than 0.1% by mass, there may be a deficiency in pigment dispersibility. When the amount is greater than 10% by mass, there may be a decrease in chargeability at high humidity.

As for the weight average molecular weight of the dispersant, the molecular weight at a maximum value of a main peak related to a styrene equivalent weight, measured by gel permeation chromatography, is preferably in the range of 500 to 100,000, more preferably 3,000 to 100,000 in view of pigment dispersibility. It is particularly preferably in the range of 5,000 to 50,000, most preferably 5,000 to 30,000. When the molecular weight is less than 500, there may be an increase in polarity and a decrease in pigment dispersibility. When the molecular weight is greater than 100,000, there may be an increase in affinity with the solvent, and a decrease in pigment dispersibility.

The amount of the dispersant is preferably in the range of 1 part by mass to 200 parts by mass, more preferably 5 parts by mass to 80 parts by mass, with respect to 100 parts by mass of the colorant. When the amount is less than 1 part by mass, there may be a decrease in dispersibility. When the amount is greater than 200 parts by mass, there may be a decrease in chargeability.

[Other Components]

The toner according to the present invention may be mixed with a carrier to constitute a two-component developer. A commonly used carrier such as ferrite or magnetite, or a resin-coated carrier may be used as the carrier.

The resin-coated carrier includes a carrier core particle, and a covering material (resin) with which the surface of the carrier core particle is covered (coated).

Examples of the resin used as the covering material include styrene-acrylic resins such as styrene-acrylic acid ester copolymer and styrene-methacrylic acid ester copolymer; acrylic resins such as acrylic acid ester copolymer and methacrylic acid ester copolymer; fluorine-containing resins such as polytetrafluoroethylene, monochlorotrifluoroethylene polymer and polyvinylidene fluoride; silicone resins, polyester resins, polyamide resins, polyvinyl butyral and amino acrylate resins. Examples thereof also include ionomer resins and polyphenylene sulfide resins. These resins may be used individually or in combination. Also, a binder-type carrier core produced by dispersing magnetic powder in resin may be used as well.

Regarding the resin-coated carrier, suitable examples of methods of covering the surface of the carrier core particle with at least a resin covering material include a method of dissolving or suspending a resin in a solvent, applying the mixture to the carrier core particle and thus attaching the mixture thereto, and a method of mixing a resin in powder form with the carrier core particle.

The proportion of the resin covering material to the resin-coated carrier may be suitably decided. Nevertheless, the amount of the resin covering material is preferably in the range of 0.01% by mass to 5% by mass, more preferably 0.1% by mass to 1% by mass, with respect to the resin-coated carrier.

Examples of cases where a magnetic material is covered with a covering (coating) material that is a mixture of two or more materials include (1) a case where 100 parts by mass of titanium oxide fine powder is treated with 12 parts by mass of a mixture of dimethyldichlorosilane and dimethyl silicone oil (1:5 in mass ratio), and (2) a case where 100 parts by mass of silica fine powder is treated with 20 parts by mass of a mixture of dimethyldichlorosilane and dimethyl silicone oil (1:5 in mass ratio).

Preferable among the above-mentioned resins are styrene-methyl methacrylate copolymer, mixtures of fluorine-containing resins and styrene copolymers, and silicone resins, particularly silicone resins. Examples of the mixtures of fluorine-containing resins and styrene copolymers include a mixture of polyvinylidene fluoride and a styrene-methyl methacrylate copolymer, a mixture of polytetrafluoroethylene and a styrene-methyl methacrylate copolymer, and a mixture of a vinylidene fluoride-tetrafluoroethylene copolymer (copolymer mass ratio: in the range of 10:90 to 90:10), a styrene-2-ethylhexyl acrylate copolymer (copolymer mass ratio: in the range of 10:90 to 90:10) and a styrene-2-ethylhexyl acrylate-methyl methacrylate copolymer (copolymer mass ratio: 20 to 60:5 to 30:10 to 50).

Examples of the silicone resins include modified silicone resins which are each produced by reacting together a nitrogen-containing silicone resin, a nitrogen-containing silane coupling agent and a silicone resin. Examples of magnetic materials for use as the carrier core particle include oxides such as ferrite, iron-excess ferrite, magnetite and γ-iron oxide, metals such as iron, cobalt and nickel, and alloys thereof.

Examples of elements contained in these magnetic materials include iron, cobalt, nickel, aluminum, copper, lead, magnesium, tin, zinc, antimony, beryllium, bismuth, calcium, manganese, selenium, titanium, tungsten and vanadium. Particularly preferred among these are copper, zinc, copper-zinc-iron ferrite containing an iron component as a main component, manganese, magnesium, and manganese-magnesium-iron ferrite containing an iron component as a main component.

The resistance value of the carrier is preferably kept in the range of $10^6$ Ω·cm to $10^{10}$ Ω·cm by adjusting the extent of bumpiness of the carrier surface and the amount of the resin applied.

The particle diameter of the carrier should be in the range of 4 μm to 200 μm, preferably 10 μm to 150 μm, more preferably 20 μm to 100 μm. The 50% particle diameter of the resin-coated carrier is preferably in the range of 20 μm to 70 μm.

Regarding the two-component developer, the amount of the toner of the present invention is preferably in the range of 1 part by mass to 200 parts by mass, more preferably 2 parts by mass to 50 parts by mass, with respect to 100 parts by mass of the carrier.

<Wax>

Also in the present invention, a wax may be included in the toner along with the binder resin and the colorant. The wax is not particularly limited, and a commonly used wax may be suitably selected therefor. Examples thereof include aliphatic hydrocarbon waxes such as low-molecular-weight polyethylene, low-molecular-weight polypropylene, polyolefin waxes, microcrystalline waxes, paraffin waxes and Sasol Wax; oxides of aliphatic hydrocarbon waxes such as oxidized polyethylene wax, and block copolymers thereof; vegetable waxes such as candelilla wax, carnauba wax, Japan wax and jojoba wax; animal waxes such as bees wax, lanolin and whale wax; mineral waxes such as ozokerite, ceresin and petrolatum; waxes composed mainly of fatty acid esters, such as montanic acid ester wax and castor wax; and partially or fully deoxidized fatty acid esters, such as deoxidized carnauba wax.

Examples of the wax further include saturated straight-chain fatty acids such as palmitic acid, stearic acid, montanic acid, and straight-chain alkylcarboxylic acids having straight-chain alkyl groups; unsaturated fatty acids such as brassidic acid, eleostearic acid and parinaric acid; saturated alcohols such as stearyl alcohol, eicosyl alcohol, behenyl alcohol, carnaubyl alcohol, ceryl alcohol, mesilyl alcohol and long-chain alkyl alcohols; polyhydric alcohols such as sorbitol; fatty acid amides such as linoleic acid amide, olefinic acid amide and lauric acid amide; saturated fatty acid bisamides such as methylenebiscapric acid amide, ethylenebislauric acid amide and hexamethylenebisstearic acid amide; unsaturated fatty acid amides such as ethylenebisoleic acid amide, hexamethylenebisoleic acid amide, N,N'-dioleyladipic acid amide and N,N'-dioleylsebacic acid amide; aromatic bisamides such as m-xylenebisstearic acid amide and N,N'-distearylisophthalic acid amide; fatty acid metal salts such as calcium stearate, calcium laurate, zinc stearate and magnesium stearate; waxes obtained by grafting aliphatic hydrocarbon waxes with vinyl monomers such as styrene and acrylic acid; partially esterified compounds composed of polyhydric alcohols and fatty acids such as monoglyceride behenate; and hydroxyl group-containing methylesterified compounds obtained by hydrogenating vegetable oils.

More suitable examples thereof include polyolefins obtained by radical polymerization of olefins under high pressure, polyolefins obtained by refining low-molecular-weight by-products produced at the time of polymerization for high-molecular-weight polyolefins, polyolefins obtained by polymerization under low pressure using a catalyst such as a Ziegler catalyst or metallocene catalyst, polyolefins obtained by polymerization utilizing a radiant ray, an electromagnetic wave or light, low-molecular-weight polyolefins obtained by thermally decomposing high-molecular-weight polyolefins, paraffin waxes, microcrystalline waxes, Fischer-Tropsch wax, synthetic hydrocarbon waxes synthesized in accordance with the Synthol method, Hydrocol method, Arge method, etc., synthetic waxes each containing as a monomer a compound which has one carbon atom, hydrocarbon waxes each having a functional group such as hydroxyl group or carboxyl group, mixtures which are each composed of a hydrocarbon wax and a functional group-containing hydrocarbon wax, and waxes produced by graft-modifying these waxes with vinyl monomers such as styrene, maleic acid ester, acrylate, methacrylate and maleic anhydride.

Further, the following can also be favorably used: the above-mentioned waxes made to have sharp molecular weight distributions, using a press sweating method, a solvent method, a recrystallization method, a vacuum distillation method, a supercritical gas extraction method or a solution crystallization method; and the above-mentioned waxes from which low-molecular-weight solid fatty acids, low-molecular-weight solid alcohols, low-molecular-weight solid compounds and/or other impurities have been removed.

In view of a favorable balance between fixation properties and offset resistance, it is preferred that the melting point of the wax be in the range of 70° C. to 140° C., more preferably 70° C. to 120° C. When the melting point is lower than 70° C., there may be a decrease in blocking resistance. When the melting point is higher than 140° C., offset resisting effects may be exhibited with difficulty.

Also, by using two or more different types of waxes together, plasticizing effects and releasing effects, which are effects produced by the waxes, can be exhibited at the same time.

Examples of waxes with plasticizing effects include waxes having low melting points, waxes having branched chains in their molecular structures, and waxes having polar groups in their molecular structures.

Examples of waxes with releasing effects include waxes having high melting points, whose molecular structures may be straight-chain structures or nonpolar structures without functional groups. Use examples thereof include use of a combination of two or more different types of waxes whose melting points are different from each other by 10° C. to 100° C., and use of a combination of a polyolefin and a graft-modified polyolefin.

In the case where two types of waxes are selected and these waxes have similar structures, relatively speaking, the wax having a lower melting point exhibits plasticizing effects and the wax having a higher melting point exhibits releasing effects. Here, when these melting points are different from each other by 10° C. to 100° C., functional separation is effectively exhibited. When the difference in melting point is smaller than 10° C., effects of functional separation may not be sufficiently exhibited. When the difference in melting point is greater than 100° C., it may be difficult to enhance the functions derived from the interaction. Here, at least one of the waxes preferably has a melting point of 70° C. to 120° C., more preferably 70° C. to 100° C., because, if so, effects of the functional separation tend to be easily produced.

Regarding the above-mentioned waxes, relatively speaking, those having branched structures, those having polar groups such as functional groups and those modified with components different from their main components exhibit plasticizing effects, whereas those having straight-chain structures, those having nonpolar structures without functional groups and those having unmodified straight structures exhibit releasing effects. Preferred examples of combinations of waxes include a combination of a polyethylene homopolymer/copolymer (composed mainly of ethylene) and a polyolefin homopolymer/copolymer (composed mainly of olefin(s) other than ethylene), a combination of a polyolefin and a graft-modified polyolefin, a combination of a hydrocarbon wax and an alcohol wax, a fatty acid wax or an ester wax, a combination of Fischer-Tropsch wax or a polyolefin wax and a paraffin wax or a microcrystalline wax, a combination of Fischer-Tropsch wax and a polyolefin wax, a combination of a paraffin wax and a microcrystalline wax, and a combination of a hydrocarbon wax and carnauba wax, candelilla wax, rice wax or montan wax.

In whatever case, it is preferred that, regarding an endothermic peak observed in a DSC measurement of a toner, the peak top temperature of the maximum peak exist in the temperature range of 70° C. to 110° C., and more preferred that the maximum peak exist in the temperature range of 70° C. to 110° C., since a favorable balance between fixation properties and storage stability of the toner can be easily secured.

The total amount of the wax contained is preferably in the range of 0.2 parts by mass to 20 parts by mass, more preferably 0.5 parts by mass to 10 parts by mass, with respect to 100 parts by mass of the binder resin.

In the present invention, the peak top temperature of the maximum peak regarding an endothermic peak of the wax measured in DSC is defined as the melting point of the wax.

As for a DSC measuring apparatus used with the wax or the toner, it is preferred that a differential scanning calorimeter of a high-precision inner heat input compensation type be used to carry out the measurement. The measuring method is in accordance with ASTMD 3418-82. As for a DSC curve used in the present invention, the temperature is increased and decreased once for prerecording, then the temperature is increased at a rate of 10° C./min and, while doing so, a DSC curve is measured, which is employed as the DSC curve.

<Fluidity Improver>

A fluidity improver may be added to the toner according to the present invention. The fluidity improver improves the fluidity of the toner (makes it easier for the toner to flow) by being added to the toner surface.

Examples of the fluidity improver include carbon black; fluorine resin powders such as fluorinated vinylidene fine powder and polytetrafluoroethylene fine powder; fine powder silica (such as wet-process silica and dry-process silica), fine powder titanium oxide and fine powder alumina; and surface-treated silica, surface-treated titanium oxide and surface-treated alumina respectively produced by surface-treating the fine powder silica, the fine powder titanium oxide and the fine powder alumina, using a silane coupling agent, a titanium coupling agent or silicone oil. Among these, preference is given to fine powder silica, fine powder titanium oxide and fine powder alumina, and greater preference is given to surface-treated silica produced by surface-treating the foregoing, using a silane coupling agent or silicone oil.

As for the particle diameter of the fluidity improver, the average primary particle diameter thereof is preferably in the range of 0.001 μm to 2 μm, more preferably 0.002 μm to 0.2 μm.

The fine powder silica is fine powder produced by gas-phase oxidation of a silicon-halogen compound and is so-called "dry-process silica" or "fumed silica".

Examples of commercially available silica fine powers produced by gas-phase oxidation of silicon-halogen compounds include AEROSIL (product named by NIPPON AEROSIL CO., LTD.) -130, -300, -380, -TT600, -MOX170, -MOX80 and -COK84; Ca—O—SiL (product named by Cabot Corporation) -M-5, -MS-7, -MS75, -HS-5 and -EH-5; WACKER HDK (product named by Wacker Chemie AG) -N20V15, -N20E, -T30 and -T40; D-C FINE SILICA (product named by Dow Corning Corp.); and FRANSOL (product named by FRANSIL).

Greater preference is given to hydrophobized silica fine powers obtained by hydrophobizing silica fine powders produced by gas-phase oxidation of silicon-halogen compounds. Among the hydrophobized silica fine powders, ones obtained by hydrophobizing silica fine powders such that their hydrophobization degrees (measured in a methanol titration test) are in the range of 30% to 80% are particularly preferable. Hydrophobization is performed by chemically or physically treating silica fine powder with an organic silicon compound, etc. capable of reacting with or physically adsorbing to the silica fine powder. A preferred method of hydrophobization is a method in which silica fine powder produce by gas-phase oxidation of a silicon-halogen compound is treated with an organic silicon compound.

Examples of the organic silicon compound include hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilylmercaptan, trimethylsilylmercaptan, triorganosilyl acrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing 0 to 1 hydroxyl group which forms an Si bond with each siloxane unit positioned at the terminal. Examples thereof further include silicone oils such as dimethylsilicone oil. These may be used individually or in combination.

The number average particle diameter of the fluidity improver is preferably in the range of 5 nm to 100 nm, more preferably 5 nm to 50 nm.

The specific surface area of the fluidity improver based on nitrogen adsorption, measured by the BET method, is preferably 30 $m^2/g$ or greater, more preferably in the range of 60 $m^2/g$ to 400 $m^2/g$. The specific surface area of any surface-treated fine powder is preferably 20 $m^2/g$ or greater, more preferably in the range of 40 $m^2/g$ to 300 $m^2/g$.

The amount of any of these fine powders is preferably in the range of 0.03 parts by mass to 8 parts by mass per 100 parts by mass of toner particles.

To the toner according to the present invention, other additives may, if necessary, be added for the purpose of protecting a latent electrostatic image bearing member and the carrier, improving cleanability, adjusting thermal properties, electric properties, physical properties, resistance and the softening point, improving the fixation rate, and so forth. Examples of the other additives include metal soaps, fluorochemical surfactants and dioctyl phthalate; conductivity imparting agents such as tin oxide, zinc oxide, carbon black and antimony oxide; and inorganic fine powders such as fine powders of titanium oxide, aluminum oxide and alumina. These inorganic fine powders may be hydrophobized if necessary. Additionally, it is possible to use a lubricant (such as polytetrafluoroethylene, zinc stearate or polyvinylidene fluoride), an abrasive (such as cesium oxide, silicon carbide or strontium titanate), a caking preventing agent, and a development improver (such as white fine particles and black fine particles having a reverse polarity to that of toner particles) in small amounts. It is also preferred that these additives be treated with any of the following, for example for the purpose of controlling the charge amount of the toner: silicone varnishes, modified silicone varnishes, silicone oils, modified silicone oils, silane coupling agents, functional group-containing silane coupling agents, treatment agents such as organic silicon compounds, and various other treatment agents.

When the developer is prepared, inorganic fine particles such as the above-mentioned hydrophobic silica fine powder may be added and mixed thereto in order to enhance the fluidity, storage stability, developing capability and transfer capability of the developer. In the case where an external additive is used, a general powder mixer may be suitably selected and used, and it is preferred that the powder mixer be equipped with a jacked or the like so as to be able to adjust the interior temperature. To change the manner in which a load is applied to the external additive, it is advisable to add the external additive at some point in the process or gradually and/or change the temperature, the length of time, the rolling speed and/or the rotational speed of the mixer, for example. Also, a strong load may be applied first and then a relatively weak load may be applied, or the other way around.

Examples of usable mixers include V-type mixers, Rocking Mixer, Lodige Mixer, Nauta Mixer and Henschel Mixer.

The method of further adjusting the form of the obtained toner is not particularly limited and may be suitably selected according to the intended purpose. Examples thereof include a method of mechanically adjusting the form of a toner (obtained by melting and kneading toner materials including a binder resin and a colorant, and then finely pulverizing them) using a hybridizer, Mechanofusion, etc.; a so-called spray-dry method in which toner materials are dissolved and dispersed in a solvent capable of dissolving a toner binder, then the solvent is removed using a spray-dry apparatus, and a spherical toner is thus obtained; and a method in which a toner is heated in an aqueous medium so as to make the toner have a spherical form.

As the external additive, inorganic fine particles can be favorably used.

Examples of the inorganic fine particles include fine particles of silica, alumina, titanium oxide, barium titanate, magnesium titanate, calcium titanate, strontium titanate, zinc oxide, tin oxide, silica sand, clay, mica, wollastonite, diatom earth, chromium oxide, cerium oxide, red ochre, antimony trioxide, magnesium oxide, zirconium oxide, barium sulfate, barium carbonate, calcium carbonate, silicon carbide and silicon nitride.

The primary particle diameter of the inorganic fine particles is preferably in the range of 0.005 μm to 2 μm, more preferably 0.005 μm to 0.5 μm.

The specific surface area of the inorganic fine particles, measured by the BET method, is preferably in the range of 20 $m^2/g$ to 500 $m^2/g$.

As for the proportion of the inorganic fine particles used, the inorganic fine particles preferably occupy 0.01% by mass to 5% by mass, more preferably 0.01% by mass to 2.0% by mass, of the toner.

Examples thereof further include fine polymer particles such as those obtained by soap-free emulsion polymerization, suspension polymerization or dispersion polymerization, exemplified by particles of polystyrene, methacrylic acid esters, acrylic acid ester copolymers, polycondensation products of silicone, benzoguanamine, nylon, etc. and thermosetting resins.

When used with a surface-treating agent, such external additives can enhance hydrophobicity and prevent degradation of themselves even at high humidity.

Suitable examples of the surface-treating agent include silane coupling agents, silylating agents, silane coupling agents containing fluorinated alkyl groups, organic titanate-based coupling agents, aluminum-based coupling agents, silicone oils and modified silicone oils.

Examples of cleanability improvers for removing a developer which remains on a latent electrostatic image bearing member and/or on a primary transfer medium after image transfer include fatty acid metal salts such as zinc stearate, calcium stearate and stearic acid, and fine polymer particles produced by soap-free emulsion polymerization or the like, such as fine polymethyl methacrylate particles and fine polystyrene particles. The fine polymer particles have a relatively narrow particle size distribution, and those which are 0.01 μm to 1 μm in volume average particle diameter are preferable.

A developing method using the toner according to the present invention may employ any latent electrostatic image bearing member used in a conventional electrophotographic method. Suitable examples of such a latent electrostatic image bearing member include organic latent electrostatic image bearing members, amorphous silica latent electrostatic image bearing members, selenium latent electrostatic image bearing members and zinc oxide latent electrostatic image bearing members.

Next, a toner composition liquid used when cooling solidification is carried out in the particle forming unit is explained.

A toner composition obtained by heat melting and cooling solidification preferably includes as a main component any of the following materials that melt and thereby yield low-viscosity liquids.

Specifically, the toner composition may include one or more components selected from a monoamide, a bisamide, a tetramide, a polyamide, an ester amide, a polyester, polyvinyl acetate, an acrylic acid polymer, a methacrylic acid polymer, a styrene polymer, an ethylene-vinyl acetate copolymer, a polyketone, a silicone, coumarone, a fatty acid ester, a triglyceride, a natural resin, a natural wax, a synthetic wax and the like.

Examples of usable polyamide resins include VERSAMID 711, VERSAMID 725, VERSAMID 930, VERSAMID 940, VERSALON 1117, VERSALON 1138 and VERSALON 1300 (manufactured by Henkel AG & Co. KGaA); and TOHMIDE 391, TOHMIDE 393, TOHMIDE 394, TOHMIDE 395, TOHMIDE 397, TOHMIDE 509, TOHMIDE 535, TOHMIDE 558, TOHMIDE 560, TOHMIDE 1310, TOHMIDE 1396, TOHMIDE 90 and TOHMIDE 92 (manufactured by FUJI KASEI KOGYO CO., LTD.). Examples of usable polyesters include KTR2150 (manufactured by Kao Corporation). Examples of usable polyvinyl acetates include AC401, AC540 and AC580 (manufactured by Allied Chemical Corp.). Examples of usable silicones include SILICONE SH6018 (manufactured by Toray Silicone Co., Ltd.); SILICONE KR215, SILICONE KR216 and SILICONE KR220 (manufactured by Shin-Etsu Silicones). Examples of usable coumarone include ESCURON G-90 (manufactured by Nippon Steel Chemical Co., Ltd.).

Examples of usable fatty acids include acids such as stearic acid, arachic acid, behenic acid, lignoceric acid, cerotic acid, montanic acid and melissic acid, and esters thereof. These may be used individually or in combination.

Examples of usable fatty acid amides include lauric acid amide, stearic acid amide, oleic acid amide, erucic acid amide, ricinoleic acid amide, stearic acid ester amide, palmitic acid amide, behenic acid amide, brassidic acid amide, and nitrogen-substituted fatty acid amides such as N,N'-2-hydroxystearic acid amide, N,N'-ethylenebisoleic acid amide, N,N'-xylenebisstearic acid amide, stearic acid monomethylol amide, N-oleylstearic acid amide, N-stearylstearic acid amide, N-oleylpalmitic acid amide, N-stearylerucic acid amide, N,N'-dioleyladipic acid amide, N,N'-dioleylsebacic acid amide, N,N'-distearylisophthalic acid amide and 2-stearamidoethyl stearate. These may be used individually or in combination.

Examples of usable fatty acid esters include monohydric or polyhydric alcohol fatty acid esters such as sorbitan monopalmitate, sorbitan monostearate, sorbitan monobehenate, polyethylene glycol monostearate, polyethylene glycol distearate, propylene glycol monostearate and ethylene glycol distearate.

Specific examples thereof include RHEODOL SP-S10, RHEODOL SP-S30, RHEODOL SA10, EMASOL P-10, EMASOL S-10, EMASOL S-20, EMASOL B, RHEODOL SUPER SP-S10, EMANON 3199, EMANON 3299 and EXEPARL PE-MS (manufactured by Kao Corporation).

Greater preference is given to fatty acid esters of glycerin.

Examples thereof include stearic acid monoglyceride, palmitic acid monoglyceride, oleic acid monoglyceride and behenic acid monoglyceride. Specific examples thereof include RHEODOL MS-50, RHEODOL MS-60, RHEODOL MS-165, RHEODOL MO-60 and EXEPARL G-MB (manufactured by Kao Corporation); DEODORIZED AND REFINED CARNAUBA WAX No. 1 and REFINED CANDELILLA WAX No. 1 (manufactured by Noda Wax K.K.); SYNCROWAX ERL-C and SYNCROWAX HR-C (manufactured by Croda International plc); and KF2 (manufactured by Kawaken Fine Chemicals Co., Ltd.). Examples of usable special ester waxes include EXEPARL DS-C2 (manufactured by Kao Corporation); and KAWASLIP-L and KAWASLIP-R (manufactured by Kawaken Fine Chemicals Co., Ltd.). Also, higher alcohol esters of higher fatty acids, such as myricyl cerotate, ceryl cerotate, ceryl montanate, myricyl palmitate, myricyl stearate, cetyl palmitate and cetyl stearate, may be used.

Here, alkyl groups are present in both fatty acids and alcohols. These fatty acid esters may be used individually or in combination. Since these fatty acid esters have low melt viscosities, exhibit stable fluidity at the time of the melting of ink, and have high flexibility and strong surface protecting force in comparison with the carbon-carbon bond, they can withstand folding of printed images. Preferred fatty acid esters are those which have penetrations of greater than 1 and which can be pressurized with ease. Further, preference is given to those which are smaller than 20 mPa·s in viscosity when jetted.

In general, polyamides are broadly classified into aromatic polyamides and dimer acid polyamides. In the present invention, use of a polyamide based upon a dimer acid is particularly preferable. Further, it is most preferred that the acid be oleic acid, linoleic acid, linolenic acid or eleostearic acid. Specific examples thereof include MACROMELT 6030, MACROMELT 6065, MACROMELT 6071, MACROMELT 6212, MACROMELT 6217, MACROMELT 6224, MACROMELT 6228, MACROMELT 238, MACROMELT 6239, MACROMELT 6240, MACROMELT 6301, MACROMELT 6900, DPX 335-10, DPX H-415, DPX 335-11, DPX 830, DPX 850, DPX 925, DPX 927, DPX 1160, DPX 1163, DPX 1175, DPX 1196 and DPX 1358 (manufactured by Henkel Hakusui Corporation); SYLVAMIDE-5 (manufactured by Arizona Chemical); and UNIREZ 2224 and UNIREZ 2970 (manufactured by Union Camp Corporation).

Examples of usable glycerides include rosin esters, lanolin esters, hardened castor oils, partially hydrogenated castor oils, extremely hardened oils of soybeans, extremely hardened oils of canola, and vegetable extremely hardened oils. These may be used individually or in combination.

Specific preferred examples of waxes include petroleum waxes such as paraffin wax and microcrystalline wax, vegetable waxes such as candelilla wax and carnauba wax, polyethylene wax, hardened castor oils, higher fatty acids such as stearic acid and behenic acid, higher alcohols, and ketones such as stearone and laurone, with particular preference being given to fatty acid ester amides, saturated or unsaturated fatty acid amides, and fatty acid esters.

Further, the above-mentioned fatty acids, fatty acid amides, glycerides, waxes, etc. may be used in every possible combination, provided that sufficient suitably can be secured.

Note that a usable colorant and the like are similar to those mentioned above.

To mix and disperse the above-mentioned components, pulverizing or dispersing apparatuses known in the art can be used without any limitation in particular. Examples of these apparatuses include types such as high-speed rotary mills, roller mills, container driving medium mills, medium stirring mills and jet mills; and types such as rotary cylindrical mills, vibrating ball mills, centrifugal ball mills, medium stirring mills and colloid mills. Specific examples thereof include cutter mills, cage mills, hammer mills, centrifugal classification mills, stamp mills, fret mills, centrifugal mills, ball bearing mills, ring roll mills, table mills, tumbling ball mills, tube mills, conical mills, tricone mills, pot mills, cascade mills, centrifugal fluidization mills, annular mills, high-speed disperses, impeller dispersers, gate mixers, bead mills, sand mills, pearl mills, Cobra mill, pin mills, Moulinex mill, stirring mills, universal mills, century mills, pressure mills, agitator mills, double roll extruders, double roll mills, triple roll mills, Netzsch mill, kneaders, mixers, stone mills, KD mill, satellite mills, high swing mills, circular mills, stirring bath-type stirring mills, vertical flow tube stirring mills, ball mills, paddle mixers, tower mills, attritors, Centrimill, sand grinders, Glen mill, attrition mills, planetary mills, vibration mills, flow jet mixers, slasher mills, peg mills, micro fluidizers, Clearmix, Rhino mill, homogenizers, pin-attached bead mills, horizontal bead mills, pin mills and Majac mill.

A toner composition liquid obtained by mixing and pulverizing/dispersing toner materials using any of the pulverizing or dispersing apparatuses may be introduced into the reservoir 11 with its malted state maintained, and then ejected from the nozzles 13 of the droplet forming unit 10 so as to form droplets. Alternatively, a toner composition liquid obtained using any of the pulverizing or dispersing apparatuses may be cooled, solidified, coarsely pulverized and stored, which is followed by introduction of the coarsely pulverized product into the reservoir 11 and heat melting, and then the melted product may be ejected from the nozzles 13 of the droplet forming unit 10 so as to form droplets.

Next, a case where a toner composition liquid containing a radiation curable substance is formed into particles and then cured by light irradiation so as to form fine particles is explained.

Here, examples of the radiation curable substance include cyclized polyisoprene, cyclized polybutadiene, poly(meth) acrylic acid esters of polyethers, cinnamic acid esters of polyvinyl alcohol, novolac resins, glycidyl polymethacrylate and chlorinated polymethylstyrene, which are generally known as radiation-sensitive resins or radiation curable resins.

These radiation curable substances are diluted with a solvent or a polymerizable monomer and then mixed with a radiation cross-linking agent or a radiation polymerization initiator. Examples of the polymerizable monomer include vinyl aromatic monomers such as styrene, α-methylstyrene, vinyltoluene, chlorostyrene and divinylbenzene; acrylic monomers such as (meth)acrylic acid, methyl (meth)acrylate, n-butyl (meth)acrylate, hydroxyethyl (meth)acrylate, ethylene glycol di(meth)acrylic acid ester and (meth)acrylonitrile; vinyl ester monomers such as vinyl formate and vinyl acetate; vinyl halide monomers such as vinyl chloride and vinylidene chloride; diallyl phthalate and triallyl cyanurate.

These polymerizable monomers may be used individually or in combination. Inclusion of any of styrene, (meth)acrylic acid ester and divinylbenzene in an amount of 0.05 parts by mass to 3 parts by mass is preferable in that fixation properties can be maintained and offset can be prevented.

Examples of the radiation cross-linking agent or the radiation polymerization initiator include azide compounds such as aromatic azides and trichloromethyl triazide, silver halide, bisimidazole derivatives, cyanine dyes and ketocoumarin dyes. Also, azo radical polymerization initiators such as azobisisobutyronitrile and azobisvaleronitrile may be used as well.

The wavelength of light for curing droplets of the toner composition liquid containing the radiation curable substance, while they are floating, is preferably between the ultraviolet wavelength region and 480 nm, particularly preferably between 250 nm and 410 nm. As a light source, a high-pressure or low-pressure mercury-vapor lamp may be used. The amount of energy required for the curing is preferably in the range of several millijoules per square centimeter to several joules per square centimeter.

EXAMPLES

Next, the present invention is explained in further detail, referring to Examples. It should, however, be noted that the present invention is not confined to these Examples.

Example 1

-Preparation of Colorant Dispersion Liquid-

First of all, a carbon black dispersion liquid as a colorant was prepared.

Twenty parts by mass of carbon black (REGAL 400, manufactured by Cabot Corporation) and 3 parts by mass of a pigment dispersant were primarily dispersed in 77 parts by mass of ethyl acetate using a mixer with stirring blades. AJISPER PB821 (manufactured by Ajinomoto Fine-Techno Co., Inc.) was used as the pigment dispersant. The obtained primary dispersion liquid was dispersed further finely by means of strong shearing force, using a Dyno-mill, and a secondary dispersion liquid from which aggregates had been completely removed was thus prepared. Further, the secondary dispersion liquid was passed through a filter (made of PTFE) having a small pore diameter of 0.45 μm such that dispersion took place to a submicron region, and a colorant dispersion liquid was thus prepared.

-Preparation of Graft Polymer-

In an autoclave reactor equipped with a thermometer and a stirrer, 480 parts by mass of xylene and 100 parts by mass of low-molecular-weight polyethylene (SANWAX LEL-400, manufactured by Sanyo Chemical Industries, Ltd., softening point: 128° C.) were placed, the polyethylene was sufficiently dissolved in the xylene, and nitrogen substitution was carried out. Thereafter, a mixed solution of 755 parts by mass of styrene, 100 parts by mass of acrylonitrile, 45 parts by mass of butyl acrylate, 21 parts by mass of acrylic acid, 36 parts by mass of di-t-butylperoxyhexahydroterephthalate and 100 parts by mass of xylene was applied dropwise at 170° C. in 3 hours so as to effect polymerization, and further, the mixture was held at this temperature for 0.5 hours. Next, solvent removal was carried out, and a graft polymer (W-1) having a number average molecular weight of 3,300, a weight average molecular weight of 18,000, a glass transition temperature of 65.0° C. and a vinyl resin solubility parameter value of 11.0 $(cal/cm^3)^{1/2}$ was thus prepared.

-Preparation of Resin-Wax Dispersion Liquid-

In a container equipped with stirring blades and a thermometer, 186 parts by mass of a polyester resin (weight average molecular weight: 20,000) as a binder resin, 10 parts by mass of carnauba wax, 4 parts by mass of the graft polymer (W-1) and 2,000 parts by mass of ethyl acetate were placed, the temperature was increased to 85° C., the mixture was stirred for 20 minutes such that the polyester resin and the carnauba wax dissolved, then rapid cooling was carried out, and fine particles of the carnauba wax were thus precipitated. The obtained dispersion liquid was subjected to dispersion to a finer degree by means of strong shearing force, using a Dyno-mill, and a resin-wax dispersion liquid was thus prepared.

-Preparation of Toner Composition Liquid-

Thirty parts by mass of the colorant dispersion liquid and 1,100 parts by mass of the resin-wax dispersion liquid were mixed together, using a mixer with stirring blades.

The obtained toner composition liquid was diluted with ethyl acetate so as to have a solid content of 6.0%, and an intended toner composition liquid was thus prepared.

-Production of Toner-

The obtained toner composition liquid was supplied to a head of a ring-type oscillator of the toner producing apparatus shown in FIG. 1.

The thin film used was a nickel plate (outer diameter: 8.0 mm, thickness: 20 μm) in which ejection holes (nozzles) that were shaped like true circles and had a diameter of 8 μm each were formed by electroforming. The ejection holes were provided in the form of a hound's-tooth check within approximately 5 mm in diameter from the center of the thin film, such that the distance between each ejection hole was 100 μm. Lead zirconate titanate (PZT) was used in a laminated manner as a piezoelectric material, and the vibration frequency was set at 100 KHz.

After the dispersion liquids were prepared, droplets were ejected for 5 hours under the following toner producing conditions, with the gas flow forming unit 20 having the structure shown in FIG. 14. Thereafter, the droplets were dried and solidified using nitrogen gas, and toner base particles were thus produced.

[Toner Producing Conditions]

Gas flow controlling portion angle α: 60 degrees
Narrowed portion inlet-side first angle β1: 60 degrees
Narrowed portion inlet-side second angle β2: 10 degrees
Narrowed portion position H: 7 mm
Narrowed portion length L: 3 mm
Narrowed portion opening diameter D: 8 mm
Narrowed portion outlet-side angle γ: 120 degrees
Narrowed portion gas flow velocity V: 20 m/s
Temperature inside apparatus: 27° C. to 28° C.
Dew-point temperature: −20° C.

The dried and solidified toner particles were suctioned and collected with a filter having a small pore diameter of 1 μm. The measurement of the particle size distribution of the collected particles by means of a flow particle image analyzer (FPIA-2000) under the following measurement conditions demonstrated that toner base particles having a weight average particle diameter (D4) of 5.4 μm and a number average particle diameter (Dn) of 5.2 μm were obtained.

-Evaluation of Toner-

The following evaluations were carried out on the obtained toner. The results of the evaluations are shown in Table 1.

<Particle Size Distribution>

The following explains a measuring method using a flow particle image analyzer. The particle size distributions of a toner, toner particles and an external additive can be measured using, for example, the flow particle image analyzer FPIA-2000, manufactured by To a Medical Electronics Co., Ltd. In the measurement, fine dust was removed from water using a filter, such that the number of particles inside a measured area (for example, 0.60 μm or larger but less than 159.21 μm in circle equivalent diameter) in $10^{-3}$ $cm^3$ of the water was 20 or less, then a few drops of a nonionic surfactant (preferably CONTAMINON N, manufactured by Wako Pure Chemical Industries, Ltd.) were added into 10 mL of the water. Then 5 mg of a measurement sample was added, dispersion was carried out for 1 minute under conditions of 20 kHz and 50 W/10 $cm^3$ using the ultrasonic dispersing apparatus UH-50 (manufactured by SMT Co., Ltd.), dispersion was further carried out for a total of 5 minutes, and the particle size distribution of particles which were 0.60 μm or larger but less than 159.21 μm in circle equivalent diameter was measured using a sample dispersion liquid in which the measurement sample had a particle concentration of 4,000 (number)/$10^{-3}$ $cm^3$ to 8,000 (number)/$10^{-3}$ $cm^3$ (when particles belonging to the measurement circle equivalent diameter range were targeted). The sample dispersion liquid was passed through a flow path (which widened with respect to the flow direction) of a flat, transparent flow cell (approximately 200 μm in thickness). To form an optical path which advanced intersecting the thickness of the flow cell, a strobe and a CCD camera were provided so as to be positioned oppositely to each other with respect to the flow cell. A strobe light was emitted at intervals of 1/30 seconds to obtain images of particles flowing in the flow cell; as a result, the particles were photographed as two-dimensional images having certain areas which were parallel to the flow cell. Based upon the areas of the two-dimensional images of the particles, the diameters of circles having the same areas were calculated as circle equivalent diameters. The circle equivalent diameters of 1,200 or more particles could be measured in approximately 1 minute, and the number of particles based upon the distribution of the circle equivalent diameters, and the proportion (number %) of particles having a prescribed circle equivalent diameter could be measured. As shown in Table 1, the results (frequent % and cumulative %) could be obtained dividing the range of 0.06 μm to 400 μm into 226 channels (one octave was divided into 30 channels). The practical measurement of particles was carried out concerning particles which were 0.60 μm or lager but less than 159.21 μm in circle equivalent diameter.

<Thin Line Reproducibility>

A developer was placed in a modified machine obtained by modifying a developing device of a commercially available copier (IMAGIO NEO 271, manufactured by Ricoh Company, Ltd.), then the modified machine was run at an image occupancy rate (printing rate) of 7%, using TYPE 6000 PAPER manufactured by Ricoh Company, Ltd. On that occasion, thin lines of the 10th image printed at an initial stage and thin lines of 30,000th image were compared with those of an original. The thin lines were observed at a magnification of 100 times using an optical microscope, and the states in which lines were missing were compared with those of stage-related samples and evaluated in four grades. A, B, C and D represent image qualities, with A being the highest, B being the second highest, C being the third highest, and D being the lowest.

As a carrier, the following was used.

[Carrier]

Core material: spherical ferrite particles having an average particle diameter of 50 μm Material constituting coating material: silicone resin The silicone resin was dispersed in toluene so as to prepare a dispersion liquid, then this dispersion liquid was applied over the core material by spray coating in a heated state, which was followed by firing and cooling, and carrier particles having an average coating resin film thickness of 0.2 μm were thus produced.

Example 2

An intended toner was obtained under the same conditions as those in Example 1 except that the gas flow controlling member was detached, in other words the gas flow controlling portion angle α was changed to 90 degrees. The toner had a weight average particle diameter (D4) of 5.5 μm and a number average particle diameter (Dn) of 5.3 μm. The above-mentioned evaluations were carried out on the obtained toner. The results are shown in Table 1.

Example 3

An intended toner was obtained under the same conditions as those in Example 2 except that the narrowed portion outlet-side angle γ was changed to 0 degrees, in other words the outlet side of the narrowed portion was in a straight form. The toner had a weight average particle diameter (D4) of 5.7 μm and a number average particle diameter (Dn) of 5.3 μm. The above-mentioned evaluations were carried out on the obtained toner. The results are shown in Table 1.

Example 4

An intended toner was obtained under the same conditions as those in Example 1 except that the narrowed portion inlet-side second angle β2 was changed so as to vary gradually between 0 degrees and 60 degrees and that the narrowed portion outlet-side angle γ was changed so as to vary gradually between 60 degrees and 120 degrees as shown in FIG. 10. The toner had a weight average particle diameter (D4) of 5.5 μm and a number average particle diameter (Dn) of 5.2 μm. The above-mentioned evaluations were carried out on the obtained toner. The results are shown in Table 1.

Example 5

An intended toner was obtained under the same conditions as those in Example 1 except that the narrowed portion inlet-side second angle β2 was changed so as to vary smoothly between 5 degrees and 90 degrees and that the narrowed portion outlet-side angle γ was changed so as to vary smoothly between 30 degrees and 120 degrees as shown in FIG. 13. The toner had a weight average particle diameter (D4) of 5.5 μm and a number average particle diameter (Dn) of 5.2 μm. The above-mentioned evaluations were carried out on the obtained toner. The results are shown in Table 1.

Comparative Example 1

Figure 15:
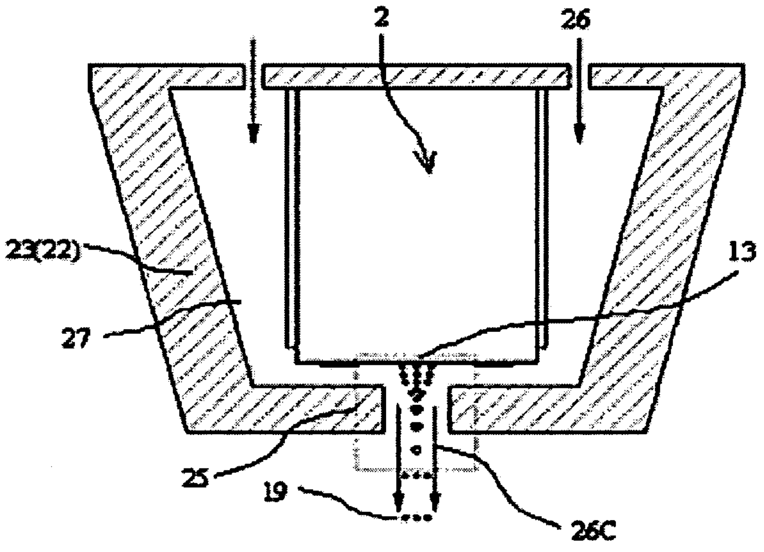
FIG. 15 is an explanatory cross-sectional view used to explain a gas flow forming unit in Comparative Example 1.

An intended toner was obtained under the following toner producing conditions, with the gas flow forming unit 20 having the structure shown in FIG. 15.

[Toner Producing Conditions]

Gas flow controlling portion angle α: gas flow controlling member was not used (90 degrees)

Narrowed portion inlet-side first angle β1: 60 degrees

Narrowed portion inlet-side second angle β2: 0 degrees

Narrowed portion position H: 7 mm

Narrowed portion length L: 3 mm

Narrowed portion opening diameter D: 8 mm

Narrowed portion outlet-side angle γ: 0 degrees

Narrowed portion gas flow velocity V: 20 m/s

Temperature inside apparatus: 27° C. to 28° C.

Dew-point temperature: −20° C.

The toner had a weight average particle diameter (D4) of 6.8 μm and a number average particle diameter (Dn) of 5.4 μm. The above-mentioned evaluations were carried out on the obtained toner. The results are shown in Table 1.

TABLE 1

| | Particle size distribution | | |
|---|---|---|---|
| | Weight average particle diameter (D4) [μm] | Number average particle diameter (Dn) [μm] | Thin line reproducibility |
| Ex. 1 | 5.4 | 5.2 | A |
| Ex. 2 | 5.5 | 5.3 | A |
| Ex. 3 | 5.7 | 5.3 | B |
| Ex. 4 | 5.5 | 5.2 | A |
| Ex. 5 | 5.5 | 5.2 | A |
| Comp. Ex. 1 | 6.8 | 5.4 | C |

As is evident from Table 1, the toner producing apparatus of the present invention made it possible to produce toners with sharp particle size distributions. Also, the use of the toners of the present invention made it possible to form images yielded by faithful development of latent images.

Figure 16:
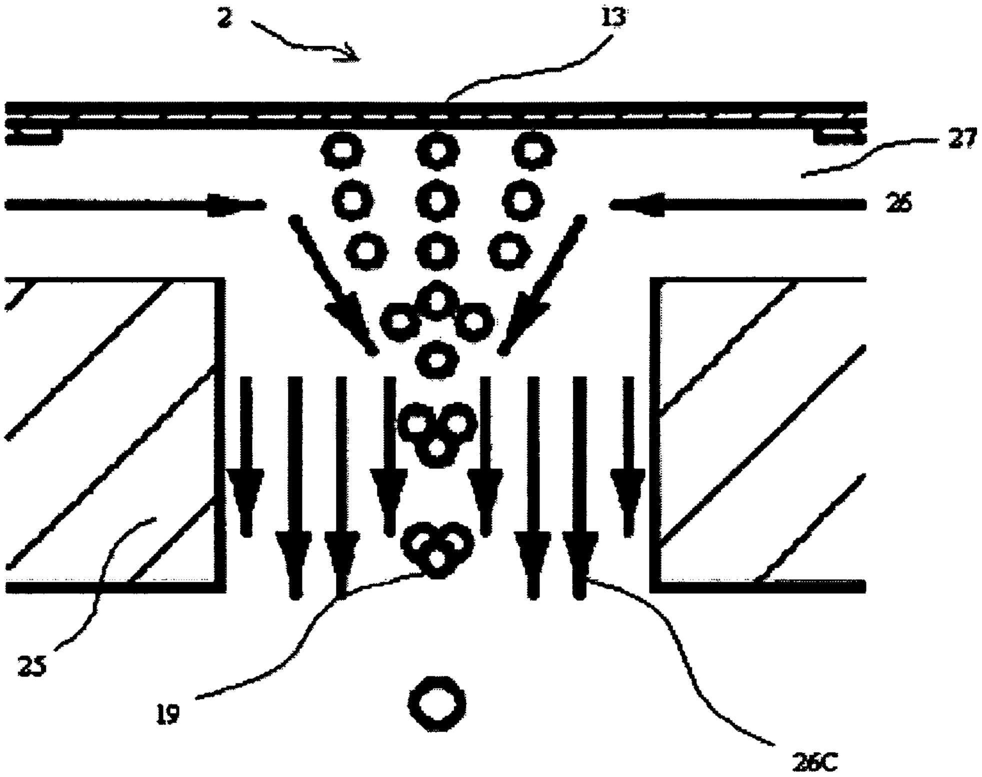
FIG. 16 is an explanatory enlarged cross-sectional view used to explain a whirling flow arising in the gas flow forming unit in Comparative Example 1.

Meanwhile, the toner producing apparatus of Comparative Example 1 produced a toner with a broad particle size distribution, and a large numbers of coarse particles, each of which was attributable to unification of a plurality of droplets, were found. It is inferred that this was because the difference in velocity between the gas flow advancing on the inner side and the gas flow advancing on the outer side was great in the passage area of the droplets 19 inside the gas flow forming unit 20 as shown in FIG. 16 (an explanatory enlarged cross-sectional view of FIG. 15), which caused the kinetic energy provided on a droplet-to-droplet basis to vary, and thus the droplets came into contact with one another and unified owing to the difference in velocity between the droplets ejected from a plurality of nozzles.

| Reference Signs List | |
|---|---|
| 1 | toner producing apparatus |
| 2 | droplet jetting unit |
| 3 | particle forming portion |
| 3A | top surface portion |
| 4 | toner composition liquid |
| 5 | toner particle |
| 6 | toner collecting portion |
| 7 | toner storing portion |
| 8 | toner composition liquid supplying portion |
| 9 | pump |
| 10 | droplet forming unit |
| 11 | reservoir |
| 12 | flow path member |
| 13 | nozzle |
| 14 | thin film |
| 14A | deformable region |
| 14B | peripheral portion |
| 14C | convex shape |
| 15 | vibration generating unit |
| 16 | lead |
| 17 | lead |
| 18 | drive circuit |
| 19 | droplet |
| 20 | gas flow forming unit |
| 21 | gas supply unit |
| 22 | gas flow path forming unit |
| 23 | gas flow path forming container |
| 24 | gas flow controlling member |
| 25 | narrowed portion |
| 26 | gas flow |
| 26C | gas flow (narrowed portion gas flow) |
| 27 | gas flow path |
| 27A | gas flow path (cross section taken along the line A-A) |
| 27B | gas flow path (cross section taken along the line B-B) |
| 28 | tapered surface |
| 29 | gas flow (whirling flow) |

-continued

| Reference Signs List | |
|---|---|
| 30 | charge eliminating unit |
| 30A | soft X-ray applying device |
| 31 | dry gas |

The invention claimed is:

1. An apparatus for producing a toner, the apparatus comprising:

a droplet forming unit configured to periodically discharge, from a plurality of nozzles, a toner composition liquid comprising a resin and a colorant;

a gas flow forming unit wherein a gas flow passes through a narrowed portion disposed on a downstream side of the plurality of nozzles with respect to a droplet discharge direction, and wherein the gas flow advances in a droplet discharge direction; and a particle forming unit that forms toner particles by solidifying droplets of the toner composition liquid passed through the narrowed portion and then discharged, wherein on an inlet side of the narrowed portion, an area of an opening which forms the narrowed portion decreases toward an outlet side of the narrowed portion.

2. The apparatus of claim 1, wherein on an outlet side of the narrowed portion, an area of an opening which forms the narrowed portion increases toward the downstream side with respect to the droplet discharge direction.

3. The apparatus of claim 1, wherein the gas flow forming unit comprises a gas supply unit and a gas flow path forming unit, wherein the gas flow path forming unit comprises a gas flow path forming container and a gas flow controlling member disposed inside the gas flow path forming container, and wherein the gas flow path forming container has a narrowed portion formed therein.

4. The apparatus of claim 3, wherein the gas flow controlling member is disposed at an outer circumferential portion of the droplet forming unit.

5. A method for producing a toner, comprising:

periodically discharging, from a plurality of nozzles, a toner composition liquid comprising a resin and a colorant to obtain droplets;

forming a gas flow which passes through a narrowed portion disposed on a downstream side of the plurality of nozzles with respect to a droplet discharge direction, and wherein the gas flow advances in a droplet discharge direction; and forming toner particles by solidifying the droplets passed through the narrowed portion and then discharged, wherein on an inlet side of the narrowed portion an area of an opening which forms the narrowed portion decreases toward an outlet side of the narrowed portion.

6. The method of claim 5, wherein on an outlet side of the narrowed portion an area of an opening which forms the narrowed portion increases toward the downstream side with respect to the droplet discharge direction.

7. The method according to claim 5, wherein the periodically discharging is performed in the presence of a droplet forming unit, wherein a gas flow controlling member is disposed at an outer circumferential portion of the droplet forming unit.

8. The apparatus of claim 1, wherein the nozzles each have a diameter of 3 μm to 35 μm.

9. The apparatus of claim 1, wherein the plurality of nozzles is 2 to 3000 nozzles.

10. The apparatus of claim 3, wherein the gas flow path forming container has continuously curved surfaces.

11. The apparatus of claim 1, wherein a velocity of the gas flow at the narrowed portion is 2 m/s to 100 m/s.

12. The apparatus of claim 1, wherein a velocity of the gas flow at the narrowed portion is 5 m/s to 60 m/s.

13. The apparatus of claim 1, wherein the toner composition liquid comprises 1% to 15% by mass of the colorant, based on a mass of the toner composition liquid.

14. The apparatus of claim 1, wherein the toner composition liquid comprises 3% to 10% by mass of the colorant, based on a mass of the toner composition liquid.

15. The apparatus of claim 1, wherein the toner composition liquid further comprises a wax.

16. The apparatus of claim 1, wherein the toner composition liquid further comprises 0.5 parts by mass to 10 parts by mass of a wax, based on 100 parts by mass of the resin.

17. The apparatus of claim 15, wherein the wax has a melting temperature of 70° C. to 120° C.

* * * * *